(12) United States Patent
Boutet et al.

(10) Patent No.: US 10,570,040 B2
(45) Date of Patent: Feb. 25, 2020

(54) WATER TREATMENT REACTOR

(71) Applicant: BIONEST TECHNOLOGIES INC., Shawinigan (CA)

(72) Inventors: Etienne Boutet, Trois-Rivières (CA); Serge Baillargeon, Trois-Rivières (CA); Garfield R. Lord, Providenciales (TC)

(73) Assignee: BIONEST TECHNOLOGIES INC., Grand-Mère (CA)

( * ) Notice: Subject to any disclaimer, the term of this patent is extended or adjusted under 35 U.S.C. 154(b) by 0 days.

(21) Appl. No.: 15/520,601

(22) PCT Filed: Oct. 20, 2015

(86) PCT No.: PCT/CA2015/000548
§ 371 (c)(1),
(2) Date: Apr. 20, 2017

(87) PCT Pub. No.: WO2016/061665
PCT Pub. Date: Apr. 28, 2016

(65) Prior Publication Data
US 2017/0320761 A1 Nov. 9, 2017

Related U.S. Application Data

(60) Provisional application No. 62/066,033, filed on Oct. 20, 2014.

(51) Int. Cl.
*C02F 3/06* (2006.01)
*C02F 3/00* (2006.01)
(Continued)

(52) U.S. Cl.
CPC ............... *C02F 3/06* (2013.01); *C02F 3/006* (2013.01); *C02F 3/10* (2013.01); *C02F 3/101* (2013.01);
(Continued)

(58) Field of Classification Search
CPC .... C02F 3/06; C02F 7/00; C02F 3/101; C02F 2103/007; C02F 3/10; C02F 3/087; C02F 3/1257; A01K 63/04
(Continued)

(56) References Cited

U.S. PATENT DOCUMENTS 3,235,234 A * 2/1966 Beaudoin .................. C02F 3/06
  210/150
5,122,266 A   6/1992 Kent
(Continued)

FOREIGN PATENT DOCUMENTS

GB    2489037 A    9/2012
WO    09315024 A1  8/1993
(Continued)

OTHER PUBLICATIONS

International Search Report and Written Opinion with regard to PCT/CA2015/000548 dated Feb. 5, 2016.
(Continued)

*Primary Examiner* — Claire A Norris
(74) *Attorney, Agent, or Firm* — BCF LLP.

(57) ABSTRACT

A reactor for treating water, the reactor comprising a buoyant structure for supporting at least one cell for suspension in a body of water in use, wherein each cell is removeably attachable to the buoyant structure and is arranged to house biomedia. A water treatment system comprising the reactor in a body of water. A method of treating water comprising passing water to be treated through the reactor in a body of water.

13 Claims, 7 Drawing Sheets

(51) Int. Cl.
*C02F 3/10* (2006.01)
*C02F 3/20* (2006.01)
*C02F 3/12* (2006.01)
*C02F 3/30* (2006.01)

(52) U.S. Cl.
CPC .............. *C02F 3/109* (2013.01); *C02F 3/121* (2013.01); *C02F 3/1247* (2013.01); *C02F 3/20* (2013.01); *C02F 3/301* (2013.01); *C02F 3/303* (2013.01); *C02F 2203/006* (2013.01); *C02F 2203/008* (2013.01); *C02F 2209/08* (2013.01); *C02F 2209/40* (2013.01)

(58) Field of Classification Search
USPC ........ 210/615, 170.05, 170.09, 242.1, 170.1, 210/747.5, 926
See application file for complete search history.

(56) References Cited

U.S. PATENT DOCUMENTS

| | | |
|---|---|---|
| 5,344,557 A | 9/1994 | Scanzillo |
| 5,421,999 A | 6/1995 | Poole et al. |
| 5,507,950 A | 4/1996 | Senda et al. |
| 5,861,095 A | 1/1999 | Vogel et al. |
| 6,136,194 A | 10/2000 | Vogel et al. |
| 6,344,144 B1 | 2/2002 | Long |
| 6,348,147 B1 | 2/2002 | Long |
| 6,444,126 B1 | 9/2002 | Gates et al. |
| 6,770,200 B2 | 8/2004 | Tharp et al. |
| 7,041,219 B2 | 5/2006 | Tharp et al. |
| 7,347,940 B2 | 3/2008 | Austin |
| 7,582,211 B2 | 9/2009 | Lord |
| 8,066,873 B2 | 11/2011 | Kaw |
| 8,293,098 B2 | 10/2012 | Smith et al. |
| 8,318,008 B1 | 11/2012 | Anderson |
| 8,758,620 B2 | 6/2014 | Tharp et al. |
| 8,821,729 B2 | 9/2014 | Pajuniemi et al. |
| 2005/0011829 A1 | 1/2005 | Dong et al. |
| 2005/0269262 A1 | 12/2005 | McBride |
| 2011/0108472 A1 | 5/2011 | Kania et al. |
| 2012/0279919 A1 | 11/2012 | Atzmon |
| 2013/0327710 A1 | 12/2013 | Reid |
| 2014/0284273 A1 | 9/2014 | Tharp et al. |
| 2015/0041376 A1* | 2/2015 | Fulford .................. C02F 3/103 210/143 |

FOREIGN PATENT DOCUMENTS

| | | |
|---|---|---|
| WO | 1994016999 A1 | 8/1994 |
| WO | 1999065829 A1 | 12/1999 |
| WO | 2003027031 A1 | 4/2003 |
| WO | 2009033291 A1 | 3/2009 |
| WO | 2012123767 A2 | 9/2012 |

OTHER PUBLICATIONS

Blanc, R. et al. "Respirometry as a Simple Operational Tool for Monitoring of MBBR and IFAS Biofilm Systems" Proceedings of the Water Environment Federation, 2010, vol. 2010, No. 7, p. 337-352.

Odegaard, H. et al. "The Influence of Carrier Size and Shape in the Moving Bed Biofilm Process" Water Science & Technology, 2000, vol. 41, p. 383-391.

Krantzberg, G. "Advances in Water Quality Control" Scientific Research Publishing, USA, 2010, Chapter three, pp. 73-124.

Extended European Search Report regarding EP 15853158.2, dated Apr. 10, 2018.

Extended European Search Report regarding EP 15853413.1 dated Mar. 7, 2018.

\* cited by examiner

WATER TREATMENT REACTOR

CROSS-REFERENCE TO RELATED APPLICATIONS

This application claims the benefit of U.S. Provisional Patent Application Ser. No. 62/066,033, filed on Oct. 20, 2014. The contents of the aforementioned application are incorporated by reference herein.

FIELD OF THE DISCLOSURE

The present disclosure relates to water treatment reactors, specifically although not exclusively to water treatment reactors for use in lagoons, as well as methods and systems of water treatment using those reactors.

BACKGROUND OF THE DISCLOSURE

Reactors for use in waste water treatment conventionally comprise an apparatus or environment in which microorganisms, such as bacteria, convert organic matter in the waste water through biological processes. The reactors may include bacteria growth devices for the bacteria to grow on. The reactors may provide an aerobic, anaerobic or anoxic environment for the microorganism-led biological reactions.

Reactors for use in lagoon wastewater treatment have faced specific challenges including the necessity of downtime during repair; requirement of skilled workers to install, repair and maintain the reactors; and difficult and cumbersome installation and repair often requiring specialized equipment. Many of these factors render such reactors expensive to sustain and inefficient.

Therefore, there is a need for reactors which overcome or reduce at least some of the above-described problems.

SUMMARY OF THE DISCLOSURE

Certain aspects and embodiments of the present disclosure may overcome or reduce some of the abovementioned problems and disadvantages. For example, by means of certain aspects and embodiments of the present disclosure, the treatment capacity in a given water body volume such as a lagoon may be increased and/or treatment quality improved; and reactor installation, maintenance and repair may be improved and reactor down-time reduced or avoided.

From one aspect, there is provided a reactor for treating water, the reactor comprising a buoyant structure for supporting at least one cell for suspension in a body of water in use, wherein each cell is removeably attachable to the buoyant structure and is arranged to house biomedia. In certain embodiments, the at least one cell comprises an array of cells attachable to the buoyant structure or to the reactor. Such an array of cells may provide stability to the reactor in use and reduce or minimize tipping. The cell may be removeably attachable to a frame of the buoyant structure, or may be attached to a cover of the reactor which cover is removeably attachable to the buoyant structure. By array of cells is meant a plurality of cells in vertical side-by-side configuration.

From another aspect, there is provided a reactor for treating water, the reactor comprising a frame for supporting at least one cell for suspension in a body of water in use, the frame defining a plurality of openings therein, at least one opening being sized and shaped to allow one cell to pass therethrough, wherein the at least one cell is detachably attachable to the frame and is arranged to house biomedia. The frame may be buoyant. In certain embodiments, a plurality of cells are provided as an array supported by the frame. In certain embodiments, each cell is modular and comprises a plurality of vertically stackable units.

From another aspect, there is provided a reactor for treating water, the reactor comprising a frame for supporting at least one cell for suspension in a body of water in use, the frame defining a plurality of openings therein, at least one opening being sized and shaped to allow one cell to pass therethrough, and a cover which is detachably attachable to the frame to cover one or more of the plurality of openings, wherein the at least one cell is attachable to the cover and is arranged to house biomedia. The frame may be buoyant. In certain embodiments, a plurality of cells are provided as an array supported by the covers of the frame. In certain embodiments, each cell is modular and comprise a plurality of vertically stackable units.

From another aspect, there is provided a reactor for treating water, the reactor comprising a buoyant structure for supporting at least one cell for suspension in a body of water in use, the at least one cell being arranged to house biomedia, wherein each cell is modular and comprises at least one unit, the units being detachably attachable to one another to vary the length of the cell. In certain embodiments, the at least one cell comprises an array of cells attachable to the buoyant structure or to the reactor.

From another aspect, there is provided a reactor for treating water, the reactor comprising a frame for supporting at least one cell for suspension in a body of water in use, the at least one cell being arranged to house biomedia, wherein each cell is modular and comprises at least one unit, the units being detachably attachable to one another to vary the length of the cell. In certain embodiments, the at least one cell comprises an array of cells attachable to the frame or to a cover of the frame.

From a further aspect, there is provided a reactor for treating water, the reactor comprising a buoyant structure for supporting a plurality of cells for suspension in a body of water in use, each cell having one or more vertically stacked units, and the plurality of cells being arranged as an array, wherein each cell is detachably attachable to the buoyant structure.

From a further aspect, there is provided a reactor for treating water, the reactor comprising a frame for supporting a plurality of cells for suspension in a body of water in use, each cell having one or more vertically stacked units, and the plurality of cells being arranged as an array, wherein each cell is detachably attachable to the frame or to a cover of the frame.

From a yet further aspect, there is provided a reactor for treating water, the reactor comprising a buoyant structure for supporting at least one cell for suspension in a body of water in use, the at least one cell being arranged to house biomedia and a gas diffuser. In certain embodiments, the at least one cell comprises an array of cells attachable to the buoyant structure or to the reactor. In certain embodiments, each cell is modular and comprises at least one unit, the units being detachably attachable to one another to vary the length of the cell.

From a yet further aspect, there is provided a reactor for treating water, the reactor comprising a frame for supporting at least one cell for suspension in a body of water in use, the at least one cell being arranged to house biomedia and a gas diffuser. In certain embodiments, the at least one cell comprises an array of cells attachable to the frame or to a cover of the frame. In certain embodiments, each cell is modular and comprises at least one unit, the units being detachably attachable to one another to vary the length of the cell.

From a yet further aspect, there is provided a reactor for treating water, the reactor comprising at least one cell housing biomedia, wherein the biomedia is self-distributing and self-supporting and occupies less than about 3% of the volume in the cell and/or reactor. In certain embodiments, the biomedia provide an effective surface area of about 160 to about 330 $m^2$ per $m^3$ of water volume. In certain embodiments, the reactor is buoyant and comprises a buoyant structure. In certain embodiments, the cell is detachably attachable to a frame of the reactor or to the buoyant structure. In certain embodiments, a plurality of cells are provided as an array supported by the frame or the buoyant structure. In certain embodiments, each cell is modular and comprises at least one unit, the units being detachably attachable to one another to vary the length of the cell.

From a yet further aspect, there is provided a reactor for treating water, the reactor comprising an array of cells for housing biomedia, and deflector walls between the cells to guide the water through the array of cells, wherein each cell is detachably attachable to a frame of the reactor or to a cover of the reactor, the cover being detachably attachable to the frame. In certain embodiments, the reactor is buoyant and comprises a buoyant structure for supporting the array of cells. In certain embodiments, each cell has one or more vertically stacked units. In certain embodiments, each cell includes an aeration diffusion device which is located at a distal portion of the cell. In certain embodiments, each unit is arranged to house biomedia, wherein the biomedia is self supporting and is distributed throughout the unit.

In certain embodiments, the buoyant structure or the reactor comprises a frame defining a plurality of openings therein. The openings may be sized and shaped to allow one cell to pass therethrough, preferably with the cells in a lengthwise orientation. In this way, cells may be separately detached and removed from reactor by lifting each cell through the opening. Alternatively, cells may be separately detached and removed from the reactor underwater i.e. by moving them away from the reactor whilst submerged in the water for example in a horizontal configuration. The frame may be grid-like. The grid-like frame may be formed from a plurality of pipes such as inter-crossing pipes. The pipes may be made of polyethylene, such as high density polyethylene, or polyvinyl chloride. Some of these pipes may also supply gas to gas diffusers.

In the buoyant reactor embodiments, the reactor comprises a buoyant structure from which the at least one cell can be removeably suspended. The buoyant structure may comprise any means which can float in water and which can support at least one cell. In one embodiment, the buoyant structure comprises hollow pipes. The reactor may further include an anchoring means to secure its position in the body of water. The buoyancy of the reactor may facilitate movement of the reactor to different parts of a body of water by moving the floating structure in the water. In the case of the body of water being a lagoon, the reactor may be moved to different parts of the lagoon for treatment. In other embodiments, the reactor itself is not buoyant but may be supported in the water to be treated by any means.

In certain embodiments, the reactor further comprises at least one detachably attachable cover for substantially covering at least one of the openings of the buoyant structure or the reactor or for substantially covering the at least one cell. In certain embodiments, the cover substantially covers the openings of the frame. In this way, the covers may provide a walkway across the frame for convenient access to the cells of the reactors. In certain embodiments, the covers are substantially light impermeable and/or light filtering. This may prevent or minimize algae growth in shallow waters which can compete with desired bacteria. The covers may also control the growth of algae, trees and plants above the cells with roots feeding from biomass and biomedia. In certain embodiments, the covers are buoyant.

In certain embodiments, the at least one cell comprises a water permeable wall arranged to retain biomedia within the cell. The water permeable wall may be a mesh having a mesh size suitable for retaining the biomedia. The at least one cell may also comprise a water permeable cover, such as a mesh, at the top of the cell, to keep biomedia submerged within water in use. In certain embodiments, the at least one cell may comprise a net for retaining biomedia. The net may be removed from the at least one cell for maintenance and replacement In certain embodiments, the reactor further comprises biomedia housed within the at least one cell. In certain embodiments, the biomedia is distributed throughout the volume of the cell. The biomedia may be housed within the wall of the at least one cell. In certain embodiments, the biomedia is configured to be self-supporting within the water. The biomedia may comprise an unattached elongate thin film with a nest-like configuration in use. The elongate thin film within the nest-like configuration is not attached to itself and may be moveable relative to itself. This relative movement between portions of the strands of the film can slough excess biofilm and avoid clogging. Excess biomass sloughing can also be brought about by hydraulic shear induced by aeration. The biomedia may have a density close to that of water so that the biomedia may remain suspended in the water in use and may eliminate the need for supporting the biomedia in the water.

The biomedia can be made of any suitable polymer, such as polyethylene, polypropylene, acrylonitrile butadiene styrene (ABS) and polyvinyl chloride (PVC). In certain embodiments, the biomedia is an elongate film about 3.0 mm wide and about 0.2 mm thick. In certain embodiments, the biomedia has a surface area of about 160 to about 330 $m^2$ per $m^3$ of water volume, or about 165 $m^2$ of biomedia per $m^3$ of water. In certain embodiments, the biomedia occupies a volume in one cell, reactor and/or cell unit of about 1.0% up to 5.0%, between about 1.0 and about 3.0%, between about 1.3% and 4%, between about 1.5% and about 3.5%, or about 1.6%.

The biomedia may occupy a volume of less than about 3.0% in the cell. Advantageously, in certain embodiments, the biomedia does not have any fixed niches and is non-clogging unlike other biomedia of the prior art, and does not require frequent maintenance. Also, as the biomedia is self-supporting, unattached and nest-like, it can spread to distribute itself in the cell's volume. This may be particularly advantageous in an anoxic zone which can be created by turning off a cell's gas diffusers. Normally in anoxic zones, a means for mixing the water is required. However, in certain embodiments of the present disclosure, the biomedia is distributed throughout the anoxic zone, therefore eliminating or reducing the need for a mixer.

In certain embodiments, the reactor and/or the cells are modular and comprise at least one unit, the units being detachably attachable to one another to vary the length of the cell. In other words, the cells may comprise vertically stackable units. Each cell may comprise one or more units detachably attached to each other in a vertical configuration. In these modular embodiments, the number of cells in the reactor can be altered. The cells can be arranged as an array in a size and shape suitable for the size, shape and volume of the body of water being treated. In this way, a reactor having a cell of a length appropriate to the depth and requirements of the body of water may be provided. The number of cells in a reactor can also be modified according to the treatment requirements of a body of water. Advantageously, each unit may comprise one or more biomedia held within the unit by a mesh. In this way, a substantially even distribution of the biomedia may be achieved within each unit and hence within each cell.

The modularity of each cell into units and/or the ability to separately attach and detach each cell from the reactor may provide ease of installation and removal of the reactor. The reactor may be installed and removed unit by unit or cell by cell. The reactor may be installed on site by attaching one cell unit at a time to a frame or buoyant structure of the reactor. The reactor may be installed on site by providing pre-assembled cells comprising a plurality of vertically stacked units and optionally an aeration device and attaching one cell at a time to a frame or buoyant structure of the reactor. Each cell may be attached to the frame or buoyant structure by lowering the cell through one of the openings before attaching the frame or buoyant structure. As a cell or cell unit will weigh less than an entire reactor, the installation and removal of a reactor may be achieved without the need for expensive and bulky lifting equipment. Also, one cell at a time may be removed for maintenance thereby avoiding the need for down-time of the reactor.

In certain embodiments, the at least one cell of the reactor contains at least one aeration device. The aeration device may be a gas diffuser. The aeration device may comprise two gas diffusers for producing bubbles of different sizes. The two gas diffusers may be separately controlled. For example, to provide fine bubbles substantially continuously during operation, and to provide coarse bubbles intermittently. The reactor may further comprise a gas supply for supplying gas to the aeration device. In certain embodiments, the pipes of the buoyant structure may function as gas conduits to the aeration devices. As diffusers in different cells can be separately controlled, it may be possible to create aerated and anoxic regions within an array of cells for performing separate functions, e.g. nitrate breakdown in anoxic regions.

In certain embodiments, the aeration device is attached to the most distal cell unit in a cell (i.e. the unit furthest cell away from the surface of the body of water). In certain embodiments, the aeration device is detachably attached to the reactor such that it can be installed and/or removed from the reactor separately from the cells. In certain embodiments, the aeration device is detachably attached to the cell such that it can be installed and/or removed from the reactor together with the cell to which it is attached. In certain embodiments, the diffuser can be removed without dismantling the reactor. The ability to detach and remove one aeration device at a time from the cell and/or the reactor may be less time consuming and easier than having to remove the entire reactor. In certain embodiments, maintenance of the reactor by removing aeration devices individually means that there is no down-time of the reactor.

In certain embodiments, the reactor further comprises deflector walls detachably attached to the buoyant structure or the frame and positioned between or around the cells to direct the flow of water through the cells. The deflector walls may be arranged to cause a substantially plug-flow effect of water flow through the cells. This is advantageous when the biomass concentration is controlled. In certain embodiments, the reactor comprises a water impermeable wall around the rector and having a reactor inlet through which the water to be treated can enter the reactor and a reactor outlet through which the treated water can flow out of the reactor, and deflector walls to guide the flow of water through and between the cells of the reactor.

In use, the cells containing biomedia will be submerged in the water to be treated. In certain embodiments, the reactor is adapted to float in a body of water with the at least one cell immersed in the water in use. In certain embodiments of the reactor, the reactor floats in the body of water.

Certain embodiments of the reactors of the present disclosure can be used in any water treatment system or method. Non-limiting examples of such uses include: new and existing lagoon-based wastewater treatment systems and methods; combination lagoon and tank-based wastewater treatment systems and methods; tank-based wastewater treatment systems and methods; aerated wastewater systems and methods; and continuous flow wastewater treatment systems and methods.

In certain embodiments, a wastewater treatment system comprises embodiments of the present reactor in a treatment chain with one or more settling zones (e.g. non-aerated zones), and/or one or more aerated mixing zones.

In one example treatment chain incorporating embodiments of the present reactor, there is provided one or more settling zones (e.g. a first settling zone), followed by an embodiment of the present reactor, followed by one or more settling zones (e.g. a second settling zone), followed by an embodiment of the present reactor, followed by a one or more settling zones (e.g. a third settling zone). This may be an energy efficient system for removing carbon and ammonia.

In another example treatment chain incorporating embodiments of the present reactor, there is provided one or more aerated mixing zones (e.g. a first aerated mixing zone), followed by an embodiment of the present reactor, followed by one or more aerated mixing zones (e.g. a second aerated mixing zone), followed by a second reactor according to an embodiment of the present disclosure, followed by one or more settling zones (e.g. a first settling zone). This system may be useful for carbon and ammonia removal, as well as low odour.

In another example treatment chain incorporating embodiments of the present reactor, there is provided one or more aerated mixing zones (e.g. one, two, three or four aerated mixing zones), followed by an embodiment of the present reactor, followed by one or more settling zones (e.g. a first settling zones). This system may be useful for ammonia removal.

In another example treatment chain incorporating embodiments of the present reactor, there is provided a first aerated mixing zone (optional), followed by an embodiment of the present reactor, followed by one or more aerated mixing zones (e.g. one, two or three aerated mixing zones), followed by one or more settling zones (e.g. a first settling zone). This system may be useful for carbon removal.

In another example treatment chain incorporating embodiments of the present reactor, combinations of the above treatment chains are possible.

From another aspect, there is provided a water treatment system comprising certain embodiments of the reactor, as described above, in a body of water. The body of water may be a lagoon. The lagoon may be aerated or non-aerated. The body of water may have an inlet and an outlet, the reactor being positioned inbetween the inlet and the outlet. In certain embodiments, the system may further comprise an inlet settling zone upstream of the reactor and/or an outlet settling zone downstream of the reactor. The inlet settling zone may have a hydraulic retention time of about 1.0 to about 3.0 days, about 1.5 to about 2.5 days, or about 2 days. The inlet settling zone may have an overflow rate of about 0.5 and 2.0 m$^3$/m$^2$ of mirror surface of body of water, per day. The outlet settling zone may have a hydraulic retention time of about 0.5 to about 1.5 days, or about 1 day. The outlet settling zone may have an overflow rate of the outlet settling zone is between about 1.0 and about 3.0 or about 0.5 and about 2.0 m$^3$/m$^2$ mirror surface of body of water per day. The reactor may be adapted to operate at a loading rate of about 2.0 to about 6.0 g of soluble carbonaceous biochemical oxygen demand per effective surface area of biomedia per day (sCBOD$_5$/m$^2$·d), or about 2.5 g sCBOD$_5$/m$^2$·d. The reactor may be adapted to operate at a loading rate of about 0.5 to about 1.5 g of soluble CBOD$_5$/m$^2$·d, about 0.75 to about 1.25 g of soluble CBOD$_5$/m$^2$·d, or about 1.25 g of soluble CBOD$_5$/m$^2$·d.

From another aspect, there is provided a water treatment system comprising a first reactor according to certain embodiments described herein and a second reactor according to certain embodiments described herein, the first and second reactors being placed in series in the body of water. The body of water may be an aerated lagoon or a non-aerated lagoon. The body of water may have an inlet and an outlet, the first and the second reactors being positioned inbetween the inlet and the outlet such that water flows in the direction of inlet to the first reactor then to the second reactor then to the outlet. In certain embodiments, the system comprises an inlet settling zone upstream of the reactor and/or an outlet settling zone downstream of the reactor. The inlet settling zone may have a hydraulic retention time of about 1.0 to about 3.0 days, about 1.5 to about 2.5 days, or about 2 days. The inlet settling zone may an overflow rate of about 0.5 and 2.0 m$^3$/m$^2$ of mirror surface of body of water, per day. The outlet settling zone may have a hydraulic retention time of about 0.5 to about 1.5 days, or about 1 day. The outlet settling zone may have an overflow rate of the outlet settling zone is between about 1.0 and about 3.0, or about 0.5 and about 2.0 m$^3$/m$^2$ mirror surface of body of water per day. In certain embodiments, the water treatment system further comprises a mid-settling zone between the first and second reactors. The mid-settling zone may have a hydraulic retention time of about 1.0 to about 4.0 days, about 1.5 to about 3.5 days, about 2 to about 3 days, or about 2.5 days. The mid-settling zone may have an overflow rate of about 0.5 to about 2.0 m$^3$/m$^2$·d. In certain embodiments, the second reactor is arranged to be operated at a lower loading rate than the first reactor. The first reactor may be adapted to operate at a loading rate of about 2.0 to about 6.0 g of soluble carbonaceous biochemical oxygen demand per effective surface area of biomedia per day (sCBOD$_5$/m$^2$·d), or about 2.5 g sCBOD$_5$/m$^2$·d. The second reactor may be adapted to operate at a loading rate of about 0.5 to about 1.5 g of soluble CBOD$_5$/m$^2$·d, about 0.75 to about 1.25 g of soluble CBOD$_5$/m$^2$·d, or about 1.25 g of soluble CBOD$_5$/m$^2$·d. In certain embodiments, the second reactor is arranged to operate at about 30-70%, or about 50%, of the loading rate of the first reactor. The water treatment system may further comprises at least one baffle positioned around the first and/or the second reactor for preventing water flow around the first and/or the second reactor. A filter may also be provided at the outlet of the body of water.

From another aspect, there is provided a method of treating water, the method comprising passing water to be treated through a reactor, according to certain embodiments of the present disclosure, in a body of water. The body of water may be a lagoon which in certain embodiments is not aerated. The method may further comprise floating the reactor in the body of water with the at least one cell immersed in the water.

In certain embodiments, the method further comprises covering the at least one cell of the reactor, or covering an opening of the frame or buoyant structure. The method may further comprise providing gas bubbles through the at least one cell of the reactor. The gas bubbles may comprise fine bubbles and/or coarse bubbles. The coarse bubbles may be provided intermittently during use, and the fine bubbles may be provided substantially continuously during use.

In certain embodiments, the method further comprises modifying the length of each cell by adding or removing cell units. As described above, this can provide ease of installation, removal and maintenance. Furthermore, the reactor can be adapted to fit the size, shape and cleaning requirements of the body of water.

In certain embodiments, the method further comprises installing the reactor in a body of water, the installing comprising floating a buoyant structure of the reactor on the body of water, then suspending the at least one cell from the buoyant structure and detachably attaching thereto. This two-part construction of each reactor, may provide ease of installation, removal and maintenance.

In certain embodiments, the method further comprises removing at least one cell of the reactor for maintenance, repair or de-installation, the removing comprising detaching the at least one cell from a buoyant structure of the reactor, followed by lifting away from the buoyant structure. Once detached from the buoyant structure, the cell may be lifted out, for example through an opening of the buoyant structure, substantially vertically. Alternatively, the cell may be allowed to float sideways, then removed one unit at a time. Alternatively, the cell may be detached from the buoyant structure, lifted vertically through the buoyant structure and each cell unit detached and removed individually.

From another aspect, there is provided a method for treating water comprising installing a reactor, as described above, on a body of water, and guiding the water to be treated through the at least one cell of the reactor; wherein installing the reactor comprises floating the buoyant structure of the reactor on the body of water, and suspending the at least one cell from the buoyant structure, and detachably attaching thereto. In certain embodiments, the method further comprises suspending a plurality of cells from the buoyant structure to form an array of cells immersed in the water in use. The method may further comprise modifying the length of each cell by adding or removing cell units. In certain embodiments, the method further comprises removing the at least one cell for maintenance, repair or de-installation, the removing comprising detaching the at least one cell from the buoyant structure, and moving the detached cell away from the buoyant structure. The buoyant structure may comprise a frame defining openings which are sized and shaped to receive the at least one cell, the method comprising lifting the cell, such as through the opening for installation, maintenance, repair or de-installation.

In certain embodiments, the method further comprises providing an anoxic region within the reactor by not providing gas bubbles in at least one cell within the reactor. It is believed that aerobic bacteria degrade organic matter (carbonaceous matter) 10 to 20 times faster than anaerobic bacteria in low concentrations effluents such as domestic wastewaters. Moreover, the main byproducts of aerobic oxidation are carbon dioxide ($CO_2$) and water ($H_2O$) rather than odorous components such as anhydride sulfur gas ($H_2S$) as in the case of anaerobic digestion. Heterotrophic aerobic bacteria are preferred to perform the following reaction:

$$COHNS+O_2+\text{bacteria} \rightarrow CO_2+H_2O+NH_3+\text{other end products}+\text{energy}$$

In aerobic treatment, ammonium can be almost completely converted into nitrates through a process called "nitrification" where adequate conditions are available. Nitrification is a two-step reaction accomplished by *Nitrosomonas* and *Nitrobacter* that can be summarized as follow:

$$NH_4^+ + 2O_2 \rightarrow NO_3^- + 2H^+H_2O$$

As nitrates/nitrites formed by nitrification are problematic, they must be removed from the effluent from the aerobic section of the reactor. This is done in the anoxic environment ('denitrification'). Heterotrophic denitrification can be described by the following equation:

$$C_{10}H_{19}O_3N + 10NO_3^- \rightarrow 5N_2 + 10CO_2 + 3H_2O + NH_3 + 10OH^-$$

During biological denitrification, nitrate ($NO_3^-$) or nitrite ($NO_2^-$) is used as an electron acceptor for the oxidation of a variety of organic or inorganic electron donors. Organic compounds include hydrogen, methanol, carbohydrates, organic acids, alcohols, benzoates and other aromatic compounds.

In certain embodiments, the method further comprises creating a substantially plug-flow effect of water flow through the at least one cell of the reactor or through the reactor. The substantially plug-flow effect may be created by providing a concentration gradient through the reactor, such as by providing a tortuous path through the plurality of cells for the water therethrough. The tortuous path may be provided by deflector walls positioned between the cells of the reactor.

The method may further comprise blocking water flow around the reactor using at least one baffle positioned around the reactor. In this way, the water to be treated must flow substantially through the reactor.

In certain embodiments, the method may further comprise mixing the water before or after passing through the reactor. In certain embodiments, the method may further comprise allowing the water to settle before or after passing through the reactor.

In certain embodiments, the method may further comprise installing a second reactor, as described above, on the body of water, positioning the second reactor in series with the first reactor, and providing a settling zone between the first and the second reactors.

In certain embodiments, the method is a continuous flow process. In other words, the method is not a batch process. By continuous flow is meant that water is substantially continuously fed to the system without any prior equalization, the water being partially equalized in the system as it flows through the different zones before being discharged at the effluent. The different physical, biological and chemical treatment mechanisms occur at the same time in pseudo-steady-state conditions but at different locations in the continuous flow system unlike in sequencing batch reactors where all mechanisms take place at the same location but at different time in non-steady-state conditions.

Advantageously, embodiments of the present method and system which are continuous flow do not require a complex control system and additional mechanical components such as timers and decanters which are needed in sequencing batch reactor systems. Furthermore, aeration does not need to be stopped for settling therefore bioconversion can be ongoing. Furthermore, unlike in sequencing batch reactors, the embodiments of the present system do not need effluent equalisation where subsequent treatment steps are required. In other words, certain embodiments of the present system and method comprise a substantially continuous input of water to be treated and a substantially continuous output of treated water. In certain embodiments, the water to be treated enters the reactor through a reactor inlet and leaves the reactor through a reactor outlet.

Advantageously, embodiments of the present method and system do not require recirculation. Embodiments of the method comprise discharging treated water through the outlet after the treatment chain comprising at least the steps of treating in the first reactor, allowing solids to settle in the mid-settling zone, and treatment in the second reactor. By not recirculating the water through the system, the efficiency of the system and the method is not compromised as recirculation may increase overflow rate and reduce solids removal.

In certain embodiments, the method comprises operating the reactor at a loading rate of about 2.0 to about 6.0 g of soluble carbonaceous biochemical oxygen demand per effective surface area of biomedia per day ($sCBOD_5/m^2 \cdot d$), or about 2.5 g $sCBOD_5/m^2 \cdot d$. The method may comprise operate the reactor at a loading rate of about 0.5 to about 1.5 g of soluble $CBOD_5/m^2 \cdot d$, about 0.75 to about 1.25 g of soluble $CBOD_5/m^2 \cdot d$, or about 1.25 g of soluble $CBOD_5/m^2 \cdot d$.

In certain embodiments, the method further comprises allowing the water to be treated to pass through an inlet settling zone having a hydraulic retention time of about 1.0 to about 3.0 days, about 1.5 to about 2.5 days, or about 2 days, before flowing through the reactor. In certain embodiments, the method further comprises allowing the water to be treated to pass through an inlet settling zone having an overflow rate of about 0.5 and 2.0 $m^3/m^2$ of mirror surface of body of water per day, before flowing through the reactor. In certain embodiments, the method further comprises allowing the water to be treated to pass through an outlet settling zone having a hydraulic retention time of about 0.5 to about 1.5 days, or about 1 day, after flowing through the reactor. In certain embodiments, the method further comprises allowing the water to be treated to pass through an outlet settling zone having an overflow rate of between about 1.0 and about 3.0, or about 0.5 and about 2.0 $m^3/m^2$ of mirror surface of body of water per day, after flowing through the reactor. In certain embodiments, the method further comprises allowing the water to be treated to pass through a settling zone having a hydraulic retention time of about 1.0 to about 4.0 days, about 1.5 to about 3.5 days, about 2 to about 3 days, about 2.5 days, after flowing through the reactor. In certain embodiments, the method further comprises allowing the water to be treated to pass through a settling zone having an overflow rate of about 0.5 to about 2.0 $m^3/m^2$ of mirror surface of body of water per day, after flowing through the reactor.

From another aspect, there is provided a method of treating water, the method comprising passing water to be treated through a first reactor and a second reactor, the first and second reactor according to any of the reactor embodiments of the present disclosure. The second reactor may be operated at a lower loading rate than the first reactor. In certain embodiments, the method further comprises operating the first reactor at a loading rate of about 2.0 to about 6.0 g of soluble carbonaceous biochemical oxygen demand per effective surface area per day ($sCBOD_5/m^2 \cdot d$), or about 2.5 g sCBOD$_5$/m$^2$·d. In certain embodiments, the method further comprises operating the second reactor at a loading rate of about 0.5 to about 1.5 g of soluble CBOD$_5$/m$^2$·d, about 0.75 to about 1.25 g of soluble CBOD$_5$/m$^2$·d, or about 1.25 g of soluble CBOD$_5$/m$^2$·d. The second reactor may be arranged to operate at about 30-70%, about 40-60%, or about 50%, of the loading rate of the first reactor. In certain embodiments, the body of water is in a lagoon. The lagoon may be non-aerated. The method may be a continuous process, and not a batch process. In certain embodiments, the method further comprises allowing the water to be treated to pass through an inlet settling zone having a hydraulic retention time of about 1.0 to about 3.0 days, about 1.5 to about 2.5 days, or about 2 days, before flowing through the first reactor. In certain embodiments, the method further comprises allowing the water to be treated to pass through an inlet settling zone having an overflow rate of about 0.5 and 2.0 m$^3$/m$^2$ of mirror surface of body of water per day, before flowing through the first reactor. In certain embodiments, the method further comprises allowing the water to be treated to pass through an outlet settling zone having a hydraulic retention time of about 0.5 to about 1.5 days, or about 1 day, after flowing through the second reactor. In certain embodiments, the method further comprises allowing the water to be treated to pass through an outlet settling zone having an overflow rate of between about 1.0 and about 3.0, or about 0.5 and about 2.0 m$^3$/m$^2$ of mirror surface of body of water per day, after flowing through the second reactor. In certain embodiments, the method further comprises allowing the water to be treated to pass through a mid-settling zone having a hydraulic retention time of about 1.0 to about 4.0 days, about 1.5 to about 3.5 days, about 2 to about 3 days, about 2.5 days, after flowing through the first reactor and before flowing through the second reactor. In certain embodiments, the method further comprises allowing the water to be treated to pass through a settling zone having an overflow rate of about 0.5 to about 2.0 m$^3$/m$^2$ of mirror surface of body of water per day, after flowing through the first reactor and before flowing through the second reactor. In certain embodiments, the method further comprises blocking water flow around the first and/or second reactor using at least one baffle positioned around the first and/or the second reactor.

Soluble carbonaceous biochemical oxygen demand may be measured using standard methods known in the art, such as those referenced in Standard Methods for the Examination of Water and Wastewater, E W Rice, American Public Health Association, 2012. By effective surface area is meant the surface area of the biomedia available during use, as discussed by BLANC, R. et al "Respirometry as a simple operational tool for monitoring of MBBR and IFAS Biofilm systems", *Proceedings of the Water Environment Federation*, 2010, vol. 2010, no 7, p. 337-352, and ØDEGAARD, H et al, "The influence of carrier size and shape in the moving bed biofilm process", *Water Science & Technology*, 2000, vol. 41, no 4, p. 383-391. It is to be distinguished from specific surface area. In some shapes and sizes of biomedia, niches become clogged very quickly meaning that the effective surface area is lower than the specific surface area. The overflow rate can be measured by daily flow rate divided by mirror surface of water body. The daily flow rate can be measured by any means e.g. a flow meter, a weir, etc.

Although originally intended for enhancing lagoon treatment capacity, the inventors found that, surprisingly, the embodiments of the present disclosure may also be of interest for wastewater treatment wherever stringent discharge requirements are enforced (<25 mg/l BOD$_5$, <25 mg/l total suspended solids (TSS), ammonia or nitrogen removal); treatment skilled operators are not available; simplicity of operation and maintenance is mandatory and relative compactness is needed. In comparison, other technologies such as membrane filtration can also be compact and meet stringent requirements, but they are not as simple to install and maintain. Other biological treatments of the prior art such as activated sludge, sequencing batch reactor, moving bed bioreactor with fluidized bacterial support or biodisks operating at high biomass concentration require skilled operators and/or equipment.

For example, sequencing batch reactors (SBR), such as that described in U.S. Pat. No. 8,758,620, have a treatment process in which water to be treated is treated in batches and not through a continuous movement of the water from an inlet to an outlet. Typically, SBRs have five phases: (1) FILL: water to be treated enters through an inlet and fills a tank; (2) REACT: the water in the tank is treated typically with aeration; (3) SETTLE: aeration and mixing is stopped and the solids are allowed to settle; (4) DECANT: clarified water is drawn through an outlet; and optionally (5) IDLE: waste sludge is removed. This is a very different process than the continuous system and process presently described. Advantageously, by means of certain embodiments of the present disclosure such as in those embodiments where anoxic regions are created, nitrification and denitrification is possible even at low temperatures which is seldom observed in lagoons.

By means of any of the above, the treatment potential can be greatly increased by installing the present reactor or system spanning over an entire surface of a body of water if required depending on the effluent quality required.

In certain embodiments where the reactor and the system are buoyant, installation, removal and maintenance is facilitated. The positioning of the reactor and/or system may also be changed within the body of water to adjust for sludge accumulation capacity, clarification overflow, F/M ratio, etc. Also, as a floating assembly can rise and fall with water levels whilst keeping biomedia submerged, the biomass conversion is not compromised. In certain embodiments, the reactors have sufficient buoyancy to support the cells, biomass, snow and ice, plant growth, and operators. Buoyancy can be aided by providing buoyant structures making up the cells and reactor, such as the covers, cell supports, gas supply pipes etc.

The modularity of the reactor and system in certain embodiments facilitates its transportation to a body of water site and allows it to be retrofit into different sizes, shapes and configurations of water. Installation does not require the use of heavy machinery and the assembly on site can be performed by unskilled manpower. As the assembly is modular, portions may be removed and replaced as needed. The modularity of the cell into units may also facilitate the distribution of the biomedia through the length of the cell.

Advantageously, in certain embodiments, gas diffusers provide energy-efficient fine bubble aeration with greatly reduced consideration for agitation rate because of the presence of fixed-film media. It may provide the ability to change an aerated region to an anoxic region by simply turning off diffusers in those cells. In certain embodiments, continuous bubbling through biomedia controls the biofilm in order to optimize substrate mass transfer inside the biofilm and to maintain the strict role of bacteria support with time. The coarse bubble diffuser may operate only few minutes per hour to promote sloughing of excess biomass on the media and control biofilm thickness.

By means of certain embodiments of the present disclosure, oxygen requirements are calculated according to $CBOD_5$ and ammonia requirements only. In certain embodiments, the fine bubble diffuser may provide aeration to meet the oxygen requirements without regard to mixing. In comparison, aerated lagoons require a minimum mixing power of 5 to 15 $m^3$ air/min/1000 $m^3$ of water body (MDDELCC). Furthermore, oxygen requirements for certain embodiments of the current disclosure can be adjusted down to account for the oxidation by nitrates if means of controlling heterotrophic denitrification through dissolved oxygen or ORP monitoring and automatic air flow adjustment are provided. In certain embodiments, the energy economy is in the order of 25 to 40% when compared to suspending biomass process or moving bed bioreactors of the prior art.

By means of an array of cells in certain embodiments, the physical stability of a buoyant reactor in the water may be improved as well as a reduction or prevention of tipping of the reactor especially during gas aeration. The maintenance of a substantially vertical alignment of a cell containing the thin film self-supporting biomedia described above may be advantageous in controlling biomass accumulation on the biomedia. Tipping of an aerated cell may lead to gas bubbles escaping from the cell with inefficient scouring of the biomedia in the cell. This may then result in excessive biomass accumulation in the biomedia, potentially leading to oxygen diffusion deficiency and hydraulic short-circuiting.

DEFINITIONS

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example "A and/or B" is to be taken as specific disclosure of each of (i) A, (ii) B and (iii) A and B, just as if each is set out individually herein.

As used herein, the term "reactor" is to be taken to mean an apparatus or a place in which a biological reaction or process can be carried out to convert dissolved and/or suspended biological matter in waste water, using for example microorganisms (e.g. bacteria). The biological reaction includes, but is not limited to, nitrification, denitrification, phosphorus removal and/or carbon removal. The conversion may be aerobic, anaerobic or anoxic.

As used herein, the term "settling zone" is to be taken to mean any area or device in which biomass can be separated from liquid, such as a non-aerated body of water where solid matter can sediment from liquid matter with or without pre-coagulation or microballasting with heavy particles; lamellas; filtering with media (sand, rock, plastic, organic) or membrane, microscreening or flotation.

As used herein, the term "biomedia", also known as a bacteria growth device or biofilm support media, is to be taken to mean any media or device having a surface suitable for bacterial growth and/or attachment. Biomedia includes but is not limited to rocks, lava, coke, gravel, slag, foams, peat moss, ceramics, cords, sand or any plastic shapes such as strips. Such media may be selected according to their effective surface area, the volume they occupy, their distribution in a water body, their cost, their durability, their sloughing ability and their impact on oxygen transfer.

As used herein, the term "water treatment system" is to be taken to mean a system for cleaning or purifying water such as domestic or industrial wastewater or highly polluted water or polluted water originating from any means.

As used herein, the term "body of water" is to be taken to mean any one or more volume(s) of water which is to be treated. The body of water may be a single body of water, or multiple bodies of water joined together. The body of water may be man-made or natural. The term "body of water" includes ponds, lagoons, basins, tanks, and combinations of the same.

BRIEF DESCRIPTION OF DRAWINGS

Further aspects and advantages of the present invention will become better understood with reference to the description in association with the following in which.

DETAILED DESCRIPTION OF THE INVENTION

Figure 1:
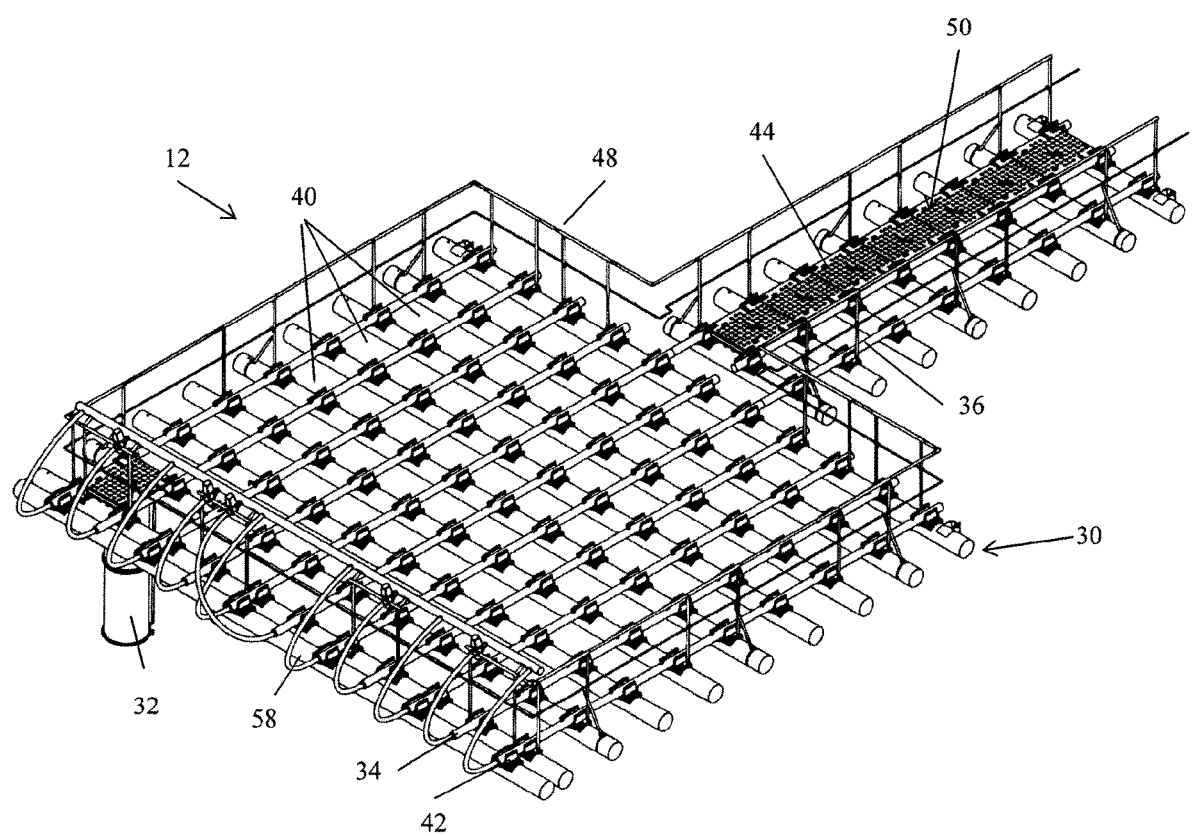
FIG. 1 illustrates one embodiment of a reactor of the present disclosure, the reactor having a buoyant structure and at least one cell.

The present invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items.

Furthermore, although an embodiment of the present invention described below with reference to FIGS. 1-7 describes a reactor for treating wastewater in a lagoon, the present invention can equally be used in or applied to any body of water or any combinations of bodies of water. Furthermore, discrete tanks could be provided as the body of water to delineate water treatment zones. The reactor, method and the system of the present disclosure can be applied to treating wastewater discharged from residential, commercial or community wastewater systems, as well as any liquid containing impurities in the present or in any other technical fields, such as industrial or agri-food wastewater. For this reason, expressions such as "waste water", and "septic" and the like should not be taken to limit the scope of the present invention and should be taken to include all other kinds of liquids or technical applications with which the present invention may be used and could be useful. Furthermore, the reactor of the present disclosure is not limited to use within a system as described in relation to FIGS. 4-7. The reactor of the present disclosure can be used in any suitable water treatment chain, system or method.

Moreover, in the context of the present invention, the expressions "wastewater", "water to be treated" and any other equivalent expression known in the art used to designate a substance displaying liquid-like features which may be contaminated or polluted or require cleaning in any otherway, as well as any other equivalent expressions and/or compound words thereof, may be used interchangeably. Furthermore, expressions such as "polluted" and "contaminated" for example, may also be used interchangeably in the context of the present description. In this specification, the terms "unit" and "segment" in relation to modular cells, are used interchangeably.

In addition, although the preferred embodiment of the present invention as illustrated in the accompanying drawings comprises various mechanical components, such as actuated ball valves, blowers, fine bubble diffusers, etc., and although the preferred embodiment of the present invention as shown consists of certain geometrical configurations and arrangements, not all of these components, geometries and/or arrangements are essential to the invention and thus should not be taken in their restrictive sense, i.e. should not be taken as to limit the scope of the present invention. It is to be understood, as also apparent to a person skilled in the art, that other suitable components and co-operations thereinbetween, as well as other suitable geometrical configurations and arrangements may be used in the wastewater treatment system and method according to the present invention, as will be briefly explained hereinafter, without departing from the scope of the invention. In the following description, the same numerical references refer to similar elements.

Figure 2:
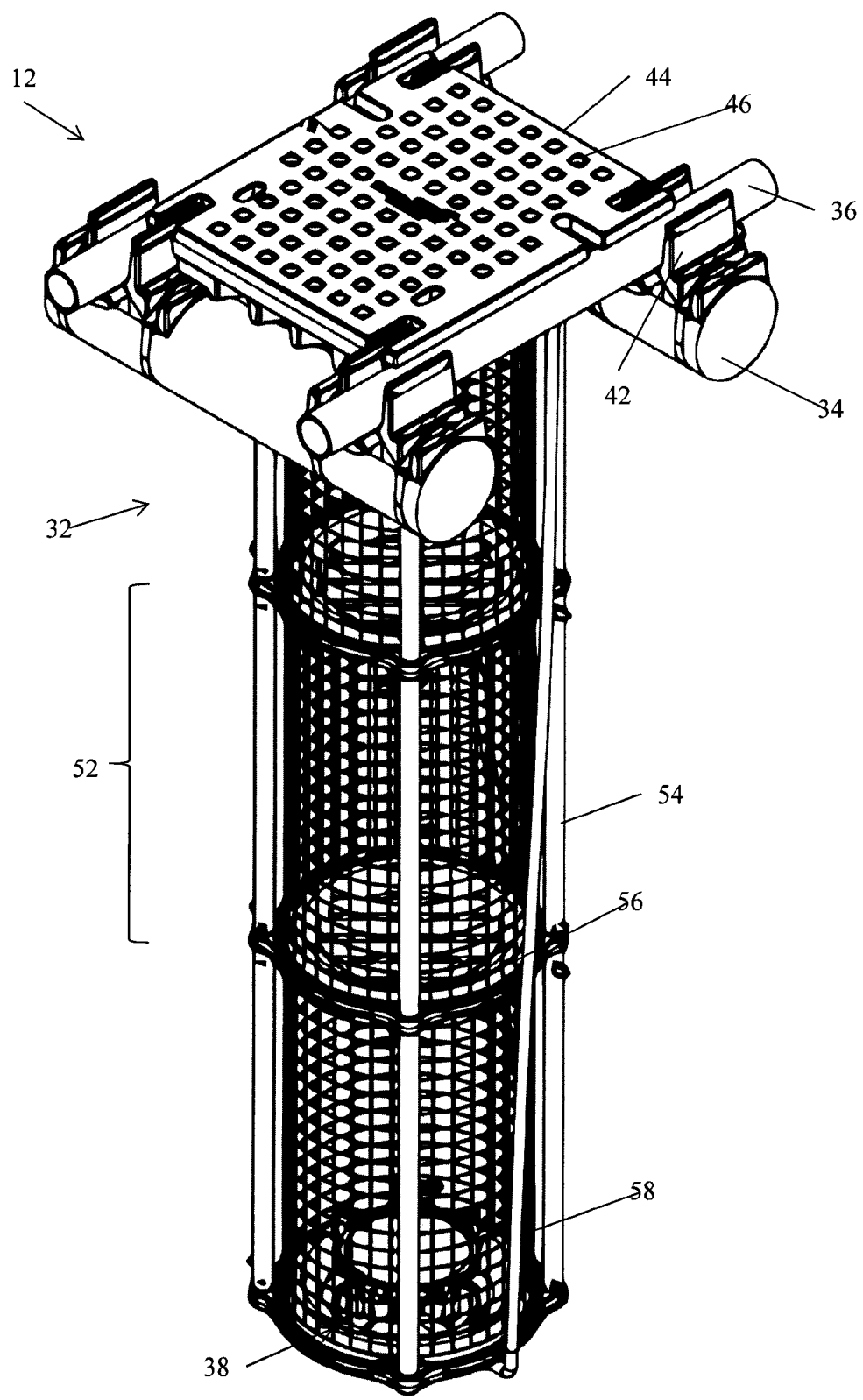
FIG. 2 illustrates one embodiment of a cell of a reactor of the present disclosure.
Figure 3:
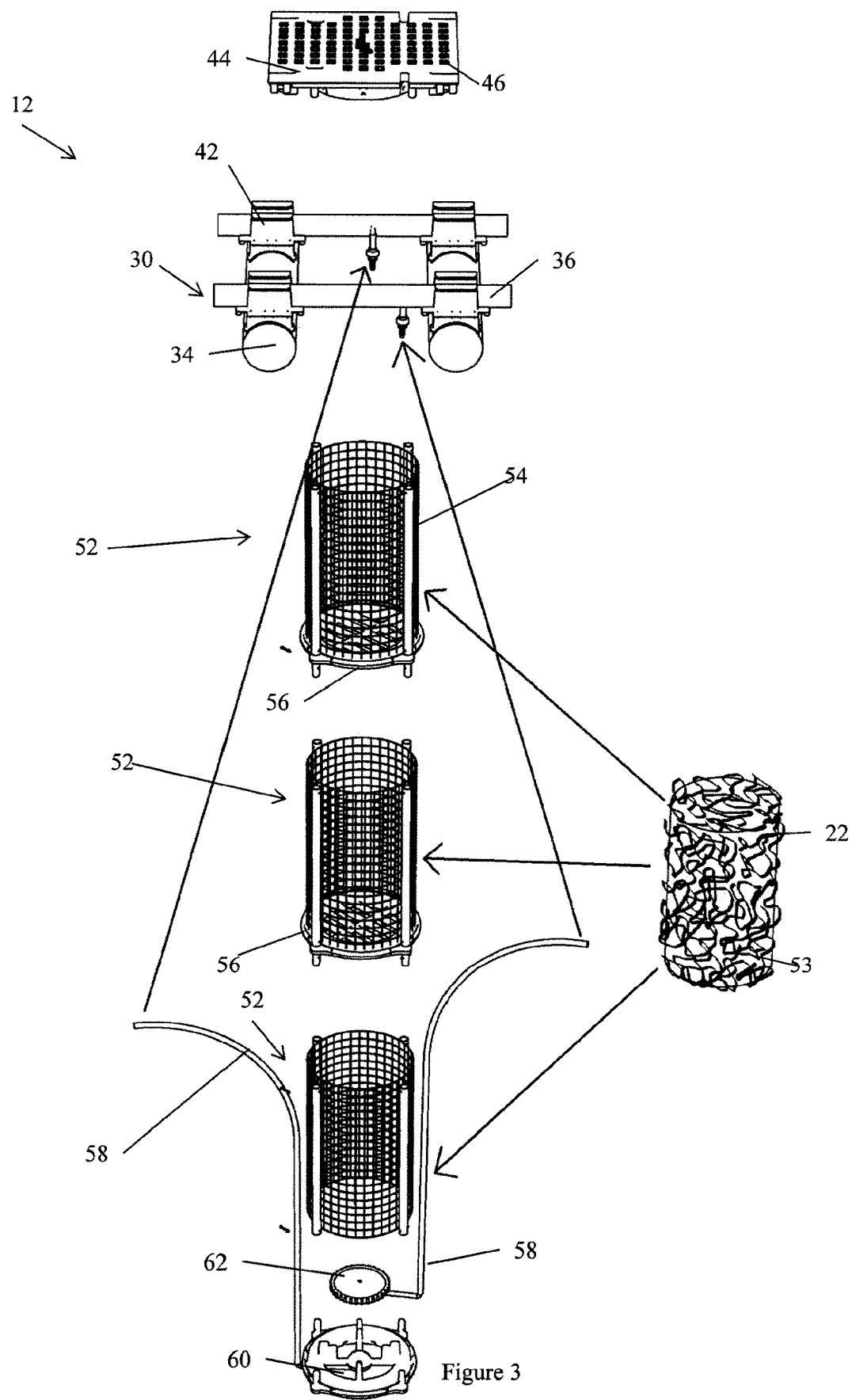
FIG. 3 shows an expanded view of the cell of FIG. 3.

Referring to FIGS. 1-3, in the illustrated embodiment, the reactor 12 comprises at least one cell 32 for housing biomedia 22. Biomedia 22 is also known as a bacteria growth device or biofilm support media, has surfaces for bacteria to attach and grow on for converting biomass.

The reactor 12 is adapted to float in the body of water 16 by means of a buoyant structure 30 for supporting the cells 32 for suspension in the body of water. In other words, the reactor 12 has a two-part construction comprising the buoyant structure 30 and the cells 32. The cells 32 can be removeably attached to the buoyant structure 30. In this embodiment, the buoyant structure 30 comprises a first set of hollow pipes 34 connected to a second set of hollow pipes 36 which carry gas to gas diffusers 38 contained at a distal end of the cells 32. The first and second sets of pipes 34, 36 form a grid formation or a frame defining a plurality of openings 40. Each opening 40 defined by the frame may be considered a unit of the buoyant structure, and each buoyant structure unit is arranged to support one cell 32. Each unit may be quadrilateral, such as square or rectangular. In this way, the cells 32 can be arranged as an array and, in use, substantially immersed in the body of water as an array. The array of cells can be any configuration e.g. 10×8.

In this embodiment, the first set of hollow pipes 34 provide the predominant buoyancy of the buoyant structure, and the second set of hollow pipes 36 provide additional buoyancy. The first set of hollow pipes 34 have a wider diameter (about 10 inches in this embodiment) than the second set 36, have sealed ends and, in use, will sit partially in the water, whereas the second set of hollow pipes 36 are arranged above the first set of hollow pipes 34 when assembled and are used as aeration lines. It will be appreciated that any other configuration of the buoyant structure 30 is also possible which provides buoyancy to the cells. Connectors 42 are provided for connecting the first and second sets of hollow pipes 34, 36 to one another at approximately 90 degrees to each other. The connectors 42 comprise two faces, a bottom face comprising a first saddle which is sized and shaped for receiving a portion of pipe from the first set of hollow pipes 34, and a top face comprising a second saddle which is sized and shaped for receiving a portion of pipe from the second set of hollow pipes 36, the first and second saddles being arranged at right angles to one another. The second set of hollow pipes 36 can have male alignment studs that fit into female holes located on the connector to facilitate the construction of the buoyant structure 30. The saddles comprise two arms extending from a curved base. The first set of hollow pipes 34 may be manufactured with the connectors 42 preinstalled before delivery to the site for ease of installation. It will be appreciated that any other type or form of connector can be used.

The hollow pipes 34, 36 comprise high density polyethylene (HDPE) or polyvinyl chloride (PVC), although it will be apparent to a skilled person that they can be made of any other material which can float or be made to float in the body of water and which has sufficient flexibility to mechanically withstand turbulence in the body of water, as well as removal and installation steps into/out of the body of water. Installation can be modular and comprises pulling or pushing the buoyant structure 30 into the water from the shore followed by attachment of the cells 32. It will be appreciated that the installation which may require considerable 'bend' of the hollow pipes due to a height difference between the shore and the water level. The buoyant structure offers flexibility to resist breakage under stress, such as waves or ice and installation/removal, but also allows enough rigidity to maintain the cells 32 in a substantially vertical configuration during aeration.

The reactor 12 also comprises at least one cover or covers 44 for covering the grid units or openings of the buoyant structure 30. The covers 44 may comprise tiles which can be removeably attached to the buoyant structure 30 by means of the hollow pipe connectors 42, or any other separate connecting means (not shown). In the embodiment of FIGS. 1-3, the covers 44 are attached to the buoyant structure by means of the connectors in which the arms of the second saddle extend sufficiently from the base to be received in slots in the cover 44. A rubber O-ring around the top of the connectors 42 is one way of attaching the cover 44 and which can provide enough elasticity to adapt to the movement of the buoyant structure 30. The cover 44 may also include openings 46 across its surface to facilitate anchoring during lifting operations. Excess air flow from the gas diffuser 38 can be evacuated in the periphery of the covers 44 to prevent the formation of ice stalagmites during cold weather. Air is forced to evacuate against warmer air lines thus limiting ice formation. The covers 44 can also function as a flooring for providing safe above water walkway access to the reactor and/or the cells for ease of maintenance or repair. The buoyant structure 30 together with the covers 44 are raft-like. As the covers 44 extend over the cells 32 in use, they also provide a protection over the cells 32 and the water being treated. For example, the covers 44 may reduce or block UV light exposure to prevent undesirable biogrowth. Furthermore, the covers 44 may be arranged to absorb solar radiation to transfer heat to the water, to maintain the temperature of the water or to prevent ice formation. For example, the covers 44 may be formed of a dark colour to absorb solar radiation.

As best seen in FIG. 1, the buoyant structure 30 also includes a handrail 48 around the perimeter of the reactor 12 as a safety feature and which can also provide a support or housing for additional components to the reactor such as a power/gas/electrical supply. The handrail 48 also supports an air manifold and an electrical ball valve controlling air feed to the gas diffuser 38 for biofilm thickness control. One part of the buoyant structure 30 may be in the form of a walkway 50 only extending from the grid to provide access from land to the cells 32. The walkway may have no cells suspended therefrom.

The buoyant structure 30 may be constructed on site or provided pre-made as a dock or a raft. The reactor 12 can be installed into the body of water by initially placing the buoyant structure 30 on the water, then attaching the cells 32 to the buoyant structure 30 by passing them through the grid openings 40. Once the cells 32 have been positioned and secured, the covers 44 may be fitted. The modular construction of the reactors and/or water treatment system enables its retrofitting into any size or shape body of water. Removal of the cells for maintenance is also simple and can be performed without skilled labour. For example, the cells can be lifted vertically through the buoyant structure openings, or be released from the buoyant structure and allowed to float horizontally.

Turning now to the construction of the cells in one embodiment, best seen in FIGS. 2 and 3, each cell 32 comprises one or more cell units 52 or cell segments for varying the length of the cells. Each cell unit 52 comprises a water permeable wall 53 (FIG. 3) for retaining the biomedia 22 within the cell supported by vertical support struts 54. FIGS. 2 and 3 illustrate a cell 32 comprising three units 52 although any number of units is possible. The cell units 52 of one cell 32 are separated vertically by a unit or segment divider 56 which also space apart the vertical struts 54 and impart a cylindrical shape to the cells 32. The segment divider 56 can be made of any material such as a polymer or concrete. In one embodiment, the segment divider 56 is non-buoyant (has a density less than that of water) to provide additional stability to the cell 32. The cells 32 can be adapted to be any size or shape. Within the most distal part of at least one cell unit in a cell, there is provided the gas diffuser 38. The gas diffuser 38 can also serve as the segment divider. The water permeable walls 53 are flexible and comprise a mesh or a net having openings sufficiently small to retain the biomedia 22 within the cell. In one embodiment, the cell 32 comprises the self-distributing self-supporting biomedia and the cell is attached to the cover of the buoyant structure to facilitate removal of the entire cell for maintenance by simply lifting the cover. In another embodiment, only the biomedia 22 or the mesh 53 is attached to the cover 44 of the buoyant structure 30 and can be removed by lifting the cover 44.

In the embodiment of FIGS. 1-3, each cell 32 is attached to the buoyant structure 30 by means of the covers 44. The vertical support struts 54 of the top cell unit are received into corresponding openings (not shown) in the cover 44 and secured by means of conventional connectors such as bolts and wing nuts. It will be appreciated that any means of securing the cell to the cover is included within the scope of the present disclosure. Each cell 32 is secured to the cover in a non-detachable or detachable manner. As the connection between the cover 44 and the buoyant structure 30 is detachable, the cells can be removed from the reactor by disconnecting the cover 44 from the buoyant structure and lifting the cover with the cell attached. In an alternative embodiment (not shown), each cell 32 is detachably attached to the buoyant structure 30 and not to the cover 44.

The cells 32 are modular in that cell units 52 can be stacked one on top of another to increase their total length. For example, each cell may have a one metre length. It has been found by the inventors that a length of about one metre prevents compaction of the biomedia 22 contained therein and imparts to the cell 32 a manageable weight for removeable and maintenance purposes taking into account the additional weight of a fully loaded biomedia with biofilm. The cage-like structure of each cell 32 also helps to minimize or reduce the weight of the structure as well as allowing for the movement of water in and out of the cells 32. The modularity of each cell 32 enables the provision of biomedia 22 throughout a depth of a body of water, even bodies of water with varying depth. Cell segments 52 can be detached from one another by removing connectors such as bolts or screws from the top of the struts 54 of each segment 52 and leaving the bottom segment divider 56 or gas diffuser 38 in the case of the last segment to retain the biomedia 22 in a basket type embodiment. This feature facilitates installation or removal of deep cells, especially when the biomedia is colonised with heavy biomass.

Turning now to the biomedia 22, any device or apparatus which can support bacterial or biofilm growth to increase biomass concentration and to biologically consume impurities contained in the body of water within the reactor 12 can be used. Biomedia with a high surface area to volume ratio is preferred. Incorporating such a biomedia within embodiments of the present disclosure has been observed to increase sludge retention time when compared to what is possible in the majority of lagoon wastewater treatment systems, apparatuses and methods known in the art. For example, the large surface area to volume ratio of the biomedia can enable the oxidation of the toxic concentrations of ammonia/nitrite/nitrate where it was not previously possible in a lagoon.

In one embodiment, the biomedia comprises one or more elongate thin films or strips which can be loosely bundled up or intertwined in an unbound, nest-like configuration, the film or strip having surfaces for bacteria to attach and grow on. A suitable biomedia has been described previously in WO 03/027031 and WO2009033291, the contents of which are incorporated herein in their entirety. The biomedia is made of a non-toxic and non-biodegradable material. The biomedia comprises a material having a density close to that of water so that advantageously the biomedia can remain submerged and suspended within the body of water. The material of the biomedia may be selected from the group consisting of acrylonitrile butadiene styrene (ABS), polyvinyl chloride (PVC), high-density polyethylene, polypropylene or any other plastic that can be heated, extruded, molded, milled, cast and/or made in a way that will allow them to form strips which can be loosely packed together. Each strip of the biomedia 22 should be constructed and arranged so as to not compress or collapse or disintegrate over time and/or stop the flow of water passing therethrough.

With regard to the dimensional features of the biomedia 22, these strips are preferably as thin as possible while being structurally sound and rigid at the same time. The rigidity is, among other factors, provided by the nature of the material used as well as the cross-sectional area of the strip. Each strip should be made of a suitable material and suitable dimensions such that it has sufficient structural integrity to not collapse on itself in order to not restrict passage of water between the strips.

In one embodiment, each strip is made of ABS although other materials can also be used. In one embodiment, each strip has a substantially rectangular cross-sectional area, a thickness of about 0.2 mm and a width of about 3.0 mm. The biomedia 22 can provide a surface area of up to about 330 $m^2$ per $m^3$ of biomedia volume, or about 165 $m^2$ of biomedia per $m^3$ of water.

In use, the biomedia 22 can occupy less than about 1.6% of the volume of water being treated. As the elongate strip biomedia can self-distribute in the water, it can provide an adequate distribution of bacteria in the volume of water being treated to therefore not require additional mixing. The biomedia is also sufficiently rigid to prevent its subsidence even under the maximal weight of bacteria. The bundled yet unbound structure of the biomedia also favors the shedding (sloughing) of excess sludge through movement of the elongate strip against itself or other strip(s). Also, the bundled configuration of the biomass does not clog, unlike biomedia of the prior art, therefore minimizing or avoiding the need for maintenance. Advantageously, embodiments of the present system utilizing such a fixed well distributed biomass do not require mixing of the body of water (e.g. aeration) thus requiring less energy than a fluidized process such as an aerated lagoon or a moving bed bioreactor.

Biofilm can reach a thickness of about 1 cm, and the sloughing of excess biofilm to maintain an ideal biofilm thickness can be helped by gas bubbles working only a couple of minutes each hour. The second set of hollow pipes 36 in the buoyant structure 30 comprises air lines 58. All air lines 58 connect to a manifold where one line out of two is closed by an electric ball valve or a similar timer controllable device. The gas diffusers 38 comprise a coarse bubble diffuser 60 and a fine bubble diffuser 62. The coarse bubble diffuser 60 is fed gas via the second set of hollow pipes 36 through a gas line, and the fine bubble diffuser 62 is fed gas via another adjacent hollow pipe 36 using another gas line. The gas bubble generation may be continuous or intermittent and be coordinated in a regular schedule depending on the rate of biofilm accumulation. In one embodiment, the fine bubble diffuser 62 provides a constant stream of fine bubbles for oxygenation of the biomedia, whereas the coarse bubble diffuser 60 is only switched on for a few minutes per hour for promoting sloughing. Therefore, the coarse bubble diffuser 60 has a timing control whereas the fine bubble diffuser has no timing control. The gas lines feeding the bubble diffusers have a structure and/or are made from a material which resists compression by water and/or ice. For example, reinforced rubber tubing may be used such as rubber pipes reinforced with a helical polyethylene. In one embodiment, the coarse bubble diffuser 60 has a separate high-pressure compressor for supplying air than the fine bubble diffuser 62.

Gas bubbles for biofilm control are generated by the gas bubble diffusers 38 (aerators) in conventional manner. The coarse bubble aerator has several leveled openings at the bottom of an air space to evenly distribute bubbles. In one embodiment, the gas is air, however any other gas may be used, such as nitrogen or oxygen for example. In the illustrated embodiment, there are eight (8) aerator ⅛" openings. The gas bubble diffusers 38 are present at the bottom of each cell 32 as gas bubbles will rise through the water as a column of bubbles.

The gas bubble diffusers 38 also enable control of aeration conditions to provide aerobic and/or anoxic zones within the same reactor 12. This means that nitrogen may also be eliminated with biological denitrification together with lowering BOD all within the same reactor.

In another embodiment, the coarse bubble diffusers are open pipes. Furthermore, the coarse bubble diffusers need not be present at the bottom of each cell 32 depending on the amount of sloughing required. For example, there may be a single course bubble diffuser provided at the bottom of a column of cell units.

Figure 7:
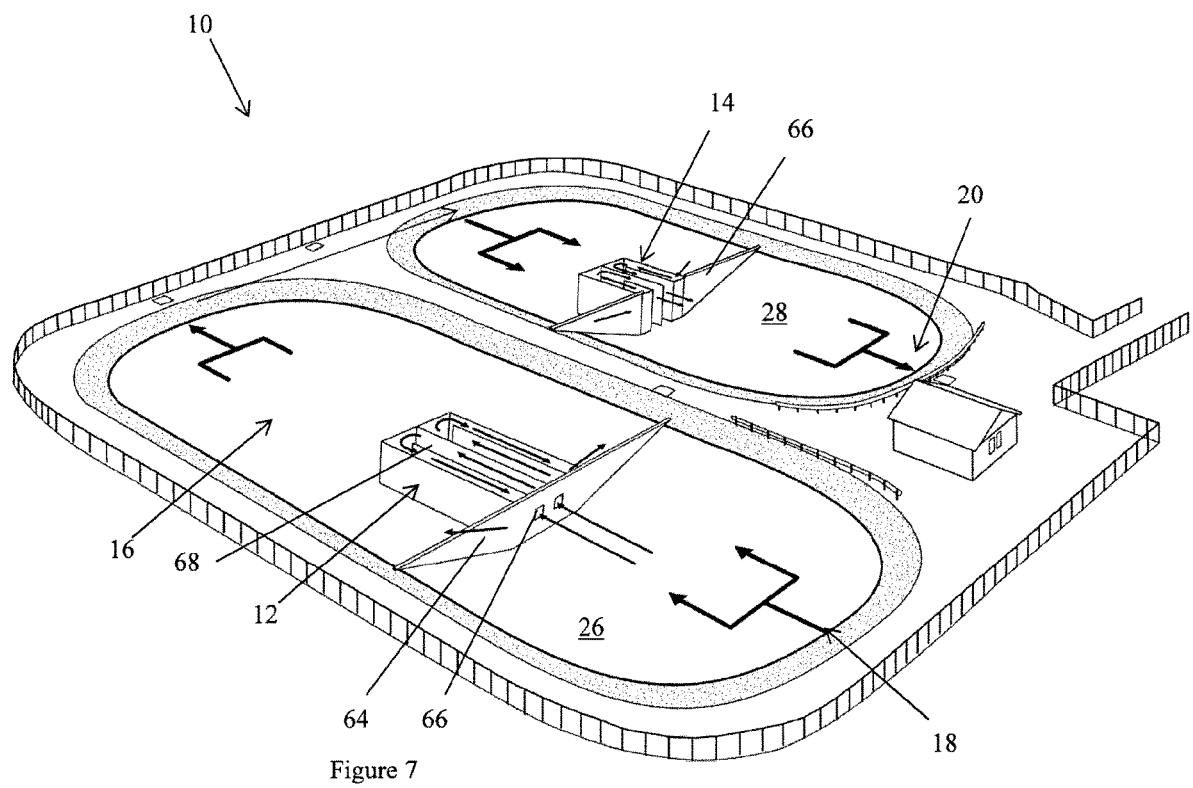
FIG. 7 shows the water treatment system of FIGS. 5 and 6 in which the direction of water flow through the system is indicated with arrows.

As best seen in FIG. 7, the reactor 12 also comprises deflector walls 68 positioned between the cells 32 to direct the flow of water through the reactors 12. In the example of FIG. 7, the deflector walls 68 are arranged to cause substantially a plug-flow effect of water flow through the cells 32. By plug-flow is meant that the concentration of the water varies along the water path through the reactor i.e. there is a concentration gradient through the path. Plug-flow conditions are known to generate a faster growth rate of the bacteria on the biomedia (theoretically about 3.9 times faster than that of a completely mix reactor for a first order kinetic). The deflector walls 68 are arranged to create long narrow channels. In one embodiment the channels are at least 2 m wide and 33 m long. In FIG. 7, it can be seen that the deflector walls 68 divide the reactor into two to maximise the distance through the reactor. The deflector walls 68 can provide any configuration of water path through the reactor, whether straight or tortuous depending on the load of the water being treated and the configuration of the body of water. The reactor inlets and outlets are located in a way to maximize the path of a particle with respect to adjacent clarification and storage zones. In this respect, the reactor 12 has an impermeable outer wall retaining water within, and only allowing water flow in and out of the reactor inlet and outlet, respectively.

In one embodiment of a method of treating water using the reactor 12, the method comprises passing water to be treated through the reactor 12 in a body of water. In one embodiment, the body of water is a non-aerated lagoon and the method is a continuous flow process. The water to be treated enters the reactor through a reactor inlet and leaves the reactor through a reactor outlet. The water to be treated flows through the reactor with a substantially plug-flow effect. By means of the baffle around the reactor, water flow around the reactor 12 can be minimized or avoided.

Embodiments of the present reactor can be used within any type of water treatment chain and any body of water. For example, embodiments of the present reactor can be used within a non-aerated lagoon or a tank. The water treatment chains, systems and methods incorporating embodiments of the present reactor are preferably continuous flow chains, systems and methods.

In one example treatment chain, there is provided one or more settling zones (e.g. a first settling zone), followed by an embodiment of the present reactor, followed by one or more settling zones (e.g. a second settling zone), followed by an embodiment of the present reactor, followed by a one or more settling zones (e.g. a third settling zone). This may be an energy efficient system for removing carbon and ammonia.

In another example treatment chain incorporating embodiments of the present reactor, there is provided one or more aerated mixing zones (e.g. a first aerated mixing zone), followed by an embodiment of the present reactor, followed by one or more aerated mixing zones (e.g. a second aerated mixing zone), followed by a second reactor according to an embodiment of the present disclosure, followed by one or more settling zones (e.g. a first settling zone). This system may be useful for carbon and ammonia removal, as well as low odour.

In yet another example treatment chain incorporating embodiments of the present reactor, there is provided one or more aerated mixing zones (e.g. one, two, three or four aerated mixing zones), followed by an embodiment of the present reactor, followed by one or more settling zones (e.g. a first settling zones). This system may be useful for ammonia removal.

In a further example treatment chain incorporating embodiments of the present reactor, there is provided one or more aerated mixing zones (optional), followed by an embodiment of the present reactor, followed by one or more aerated mixing zones (e.g. one, two or three aerated mixing zones), followed by one or more settling zones (e.g. a first settling zone). This system may be useful for carbon removal.

Figure 4:
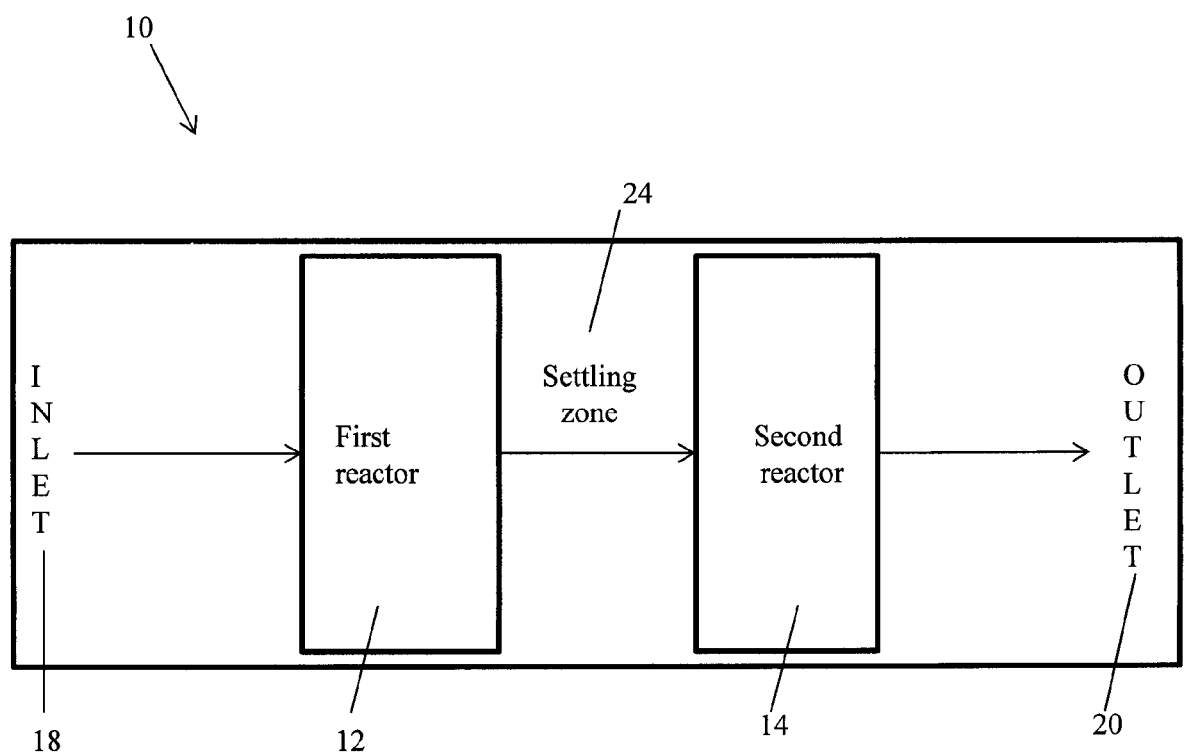
FIG. 4 is a schematic representation of one embodiment of a water treatment system comprising a reactor according to certain embodiments of the present disclosure.

FIG. 4 shows a schematic representation of one use or treatment chain of the reactor 12 in a water treatment system 10.

In this embodiment, the system 10 comprises two reactors according to the present disclosure: a first reactor 12 and a second reactor 14. The first and second reactors are arranged to be placed in series in a body of water 16 having an inlet 18 and an outlet 20. The water treatment system 10 comprises a mid-settling zone 24 between the first and second reactors 12, 14. By means of this arrangement, water to be treated flows through the first reactor 12, then the mid-settling zone 24, followed by the second reactor 14. Optionally, the water treatment system 10 further comprises an inlet settling zone 26 for primary clarification, sludge storage and/or retaining decantable (settleable) solids from raw sewage. Optionally, the water treatment system 10 further comprises an outlet settling zone 28 for final clarification and sludge storage zone at the outlet. In certain embodiments, a filter (not shown) is also provided at the outlet 20.

Figure 5:
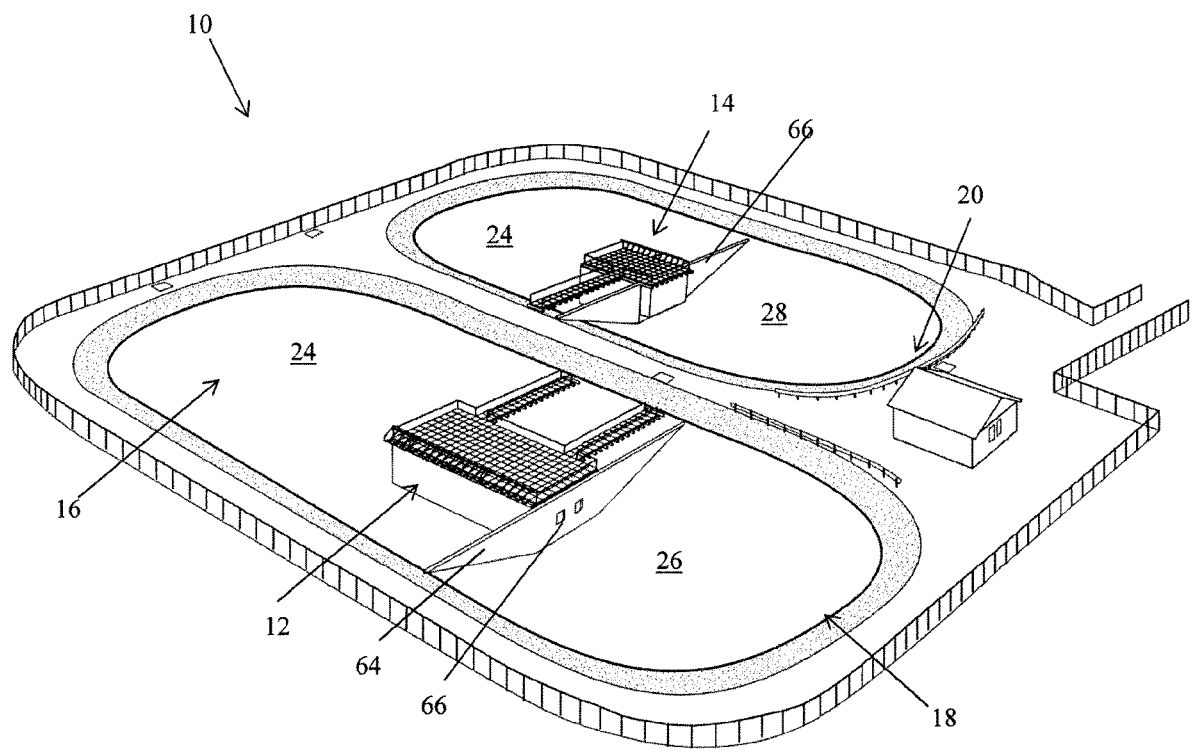
FIG. 5 is a schematic representation of the water treatment system of FIG. 4 when used in a lagoon, according to another embodiment of the present disclosure, the water treatment system comprising reactors having at least one cell and at least one settling zone.
Figure 6:
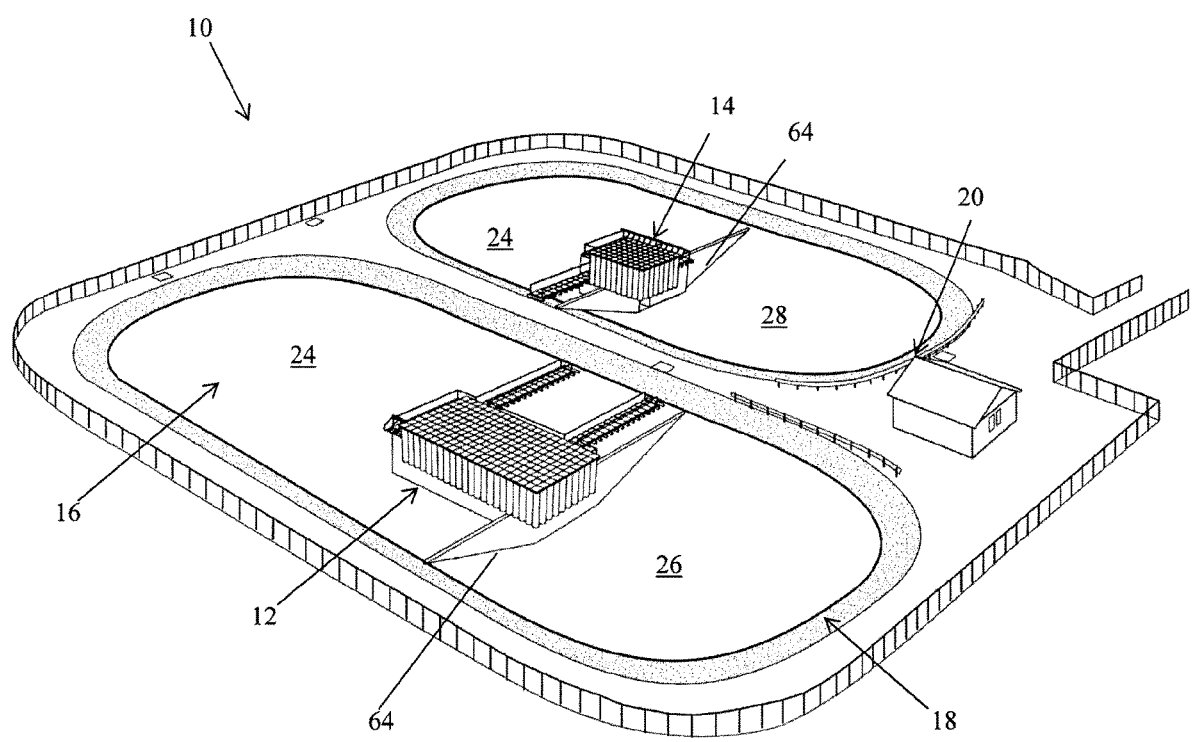
FIG. 6 shows the water treatment system of FIG. 5 in which the cells are visible.

According to another embodiment which is illustrated in FIGS. 5-7, the body of water 16 comprises a lagoon having an inlet 18 and an outlet 20. In this embodiment, the lagoon has two basins in fluid communication with one another although the system 10 of the present disclosure can be adapted to be incorporated into any type of body of water or any combinations of different bodies of water, with any configuration. The embodiment of FIGS. 5-7 comprises (i) an inlet settling zone 26 upstream of the first reactor 12 and downstream of the inlet 18, (ii) a mid-settling zone 24 inbetween the first and second reactors 12, 14, and (iii) an outlet settling zone 28 downstream of the second reactor 14 and upstream of the outlet 28. The reactors 12, 14 and the settling zones 24, 26, 28 are positioned in series. There is no recirculation of water in this embodiment of the system 10.

The settling zones 24, 26, 28 are portions of the body of water 16 in which particulate matter such as sludge and scum can settle, for example by sedimentation, and be stored. Other means of settling solid and particulate matter are also possible such as by filtering, screening or flotation. The inlet settling zone 26 of this embodiment, allows primary clarification and sludge storage for retaining decantable solids such as raw solids from raw sewage thereby allowing soluble matter to be treated by the first reactor 12. The mid-settling zone 24 is for settling and storing particulate matter leaving the first reactor 12. The outlet settling zone 28 is for settling the secondary particulate matter generated by the second reactor 14 which may avoid the need for a clarifying reactor or separate sludge removal.

In the embodiment of the system of FIGS. 5-7, there is provided at least one baffle 64 positioned across or around the first and/or the second reactor 12, 14 for preventing water flow around the first and/or the second reactor 12, 14. The baffles 64 are made of a flexible, water impermeable material such as a polymer or a rubber. In the case of baffles 64 which extend across the reactor, at least one baffle opening 66 is provided for allowing water to flow into the reactor. The baffles 66 are anchored to the bottom and sides of the lagoon such as by ballasting by a chain and are attached to the first set of hollow pipes 34 of the floating structure 30 using cables or cord. They provide a physical barrier to the flow of water causing the water to flow into the reactors 12, 14 and not around them. Holes in the baffles allow passage from one zone to another of the treatment chain. The height of the holes can be adjusted to optimize biomass separation. For instance, holes at the outlet of a clarification and storage zone can be located at the bottom to benefit from sludge blanket filtering accumulating near the exit. They can also be located in the middle to retain sludge at the bottom and scum at the top. Overflow from the top of the deflector wall can be desirable in situations where no scum is expected.

In another embodiment, a filter (not shown) is provided around the final outlet 20 of the lagoon. The filter can be a bundle of biomedia as described above, within a net and having a density in the water of about 330 $m^2$ of biomedia per $m^3$ of water.

According to embodiments of the present disclosure, the reactor 12 can be arranged to handle any suitable load by adjusting the number of cells and amount of biomedia. When more than one reactor of the present disclosure is used in a treatment chain, the reactors can be arranged to handle different loads. For example, in certain embodiments such as that illustrated in FIGS. 5-7, the second reactor 14 is arranged to handle a lower loading than the first reactor 12. The second reactor 14 may be arranged to operate at about 30-70%, about 40-60% or about half the loading rate compared to the first reactor 12. Fermentation and hydrolysis of sludge can reduce sludge volume and slightly increase organic soluble matter flowing through the first reactor. Operating the first reactor 12 at a high soluble BOD loading rate can produce biomass with good settling characteristics. By "high soluble BOD loading rate" means higher than about 2.0 g $sCBOD_5/m^2$ of biomedia per day. In certain embodiments, the first reactor 12 is adapted such that approximately half the BOD is oxidized to carbon dioxide by the first reactor 12.

The second settling zone 24 can allow the retention of approximately another quarter of influent BOD through settling of up to about 75% of suspended solids almost entirely composed of biomass generated from soluble $CBOD_5$ from the first reactor 12. Again, fermentation and hydrolysis are likely to take place in the accumulated sludge at the bottom of the water body. The second reactor 14 is adapted to be operated at lower organic load to produce a high quality effluent. A lower surface loading of the biomedia can provide better contact time of soluble and particulate substrates with the biofilm. Entrapment of finer particles in the biofilm and advanced conversion of soluble substrates can lead to low $CBOD_5$ concentration. Settling characteristics of biomass detaching from the second reactor may be lower than in the first settling zone, but a low overflow rate in the final settling zone and final filtration of effluent through dense biomedia upstream of the outlet may result in a concentration below about 15 mg/l for both $BOD_5$ and TSS even at temperatures as low as about 0.5° C. In certain embodiments, at temperatures above about 8° C., full nitrification may be possible depending on the loading rates and nitrogen removal if anoxic zones are created. When the temperature of the water falls below 8° C., the decay rate of nitrifiers becomes faster than the growth rate, but the accumulated autotrophic biomass during the warmer months allows partial nitrification down to near freezing conditions. The first and the second reactors 12, 14 may be adapted to achieve a 5 day hydraulic retention time (HRT) to achieve required effluent levels. Compare this with a traditional aerated lagoon, where typically a 15-60 day HRT is required in order to meet regulations (see e.g. KRANTZBERG, G. (2010). *Advances in water quality control*. Scientific Research Publishing, USA). Embodiments of the present disclosure can reduce the HRT down to about 5 days. In other words, embodiments of the present disclosure do not require long hydraulic retention times. Embodiments of the present disclosure have a HRT of less than 15 days, less than 10 days, less than 9 days, less than 8 days, less than 7 days, less than 6 days, or less than 5 days. In this way, loading can be increased by at least two-fold. Hydraulic retention time, can be understood to mean the measure of the average length of time that a soluble compound of wastewater remains in a bioreactor system. Hydraulic retention time is calculated by dividing the system volume by the wastewater flow rate (see e.g. Federation of Canadian Municipalities and National Research Council (FCMNRC), 2004. Optimization of Lagoon Operation. https://www.fcm.ca/Documents/reports/Infraguide/Optimization_of_Lagoon_Operations_EN.pdf).

In one embodiment, the first reactor 12 is adapted to operate at a loading rate of about 2.0 to about 6.0 g of soluble carbonaceous biochemical oxygen demand per effective surface area of biomedia per day (sCBOD$_5$/m$^2$·d), or about 2.5 g sCBOD$_5$/m$^2$·d. The second reactor 14 is adapted to operate at a loading rate of about 0.5 to about 1.5 g of soluble CBOD$_5$/m$^2$·d, about 0.75 to about 1.25 g of soluble CBOD$_5$/m$^2$·d, or about 1.25 g of soluble CBOD$_5$/m$^2$·d. In one embodiment, the inlet settling zone 26 is adapted to have a hydraulic retention time of about 1.0 to about 3.0 days, about 1.5 to about 2.5 days, or about 2 days, and/or an overflow rate of about 0.5 and 2.0 m$^3$/m$^2$ of mirror surface of body of water, per day. In one embodiment, the outlet settling zone 28 is adapted to have a hydraulic retention time of about 0.5 to about 1.5 days, or about 1 day, and/or an overflow rate of between about 1.0 and about 3.0, or about 0.5 and about 2.0 m$^3$/m$^2$ mirror surface of body of water per day. In one embodiment, the settling zone 24 between the first and second reactors 12, 14 is adapted to have a hydraulic retention time of about 1.0 to about 4.0 days, about 1.5 to about 3.5 days, about 2 to about 3 days, about 2.5 days, and/or an overflow rate of about 0.5 to about 2.0 m$^3$/m$^2$·d.

Referring now to one embodiment of a method of treating water, the method comprises passing water to be treated through the reactor 12 as described above in a body of water. The method comprises covering the at least one opening 40 of the frame of the reactor and providing fine and course gas bubbles through the cell 32. The coarse bubbles are provided intermittently during use, and the fine bubbles are provided substantially continuously during use. An aerobic area is the reactor 12 is created by bubbling oxygen-containing gas using the gas diffusers 38 in cells 32 in a first portion of the array of cells 32 whilst cells in a second portion of the array remain anoxic by keeping the diffusers turned off. Alternatively, the reactors may be aerated in any other way. In one embodiment, the settling zones are non-aerated, by turning off aeration of the lagoon for example.

The method further comprises installing the reactor in a body of water by floating a buoyant structure 30 of the reactor 12 on the body of water, then suspending the at least one cell 32 from the buoyant structure 30 and detachably attaching thereto. The method further comprises removing at least one cell 32 of the reactor 12 for maintenance, repair or de-installation, the removing comprising detaching the at least one cell 32 from the buoyant structure 30, followed by lifting away from the buoyant structure 30. Once detached from the buoyant structure 30, the cell 32 may be lifted out, for example through the opening 40. Alternatively, the cell 32 may be allowed to float sideways, then optionally removed one unit at a time. Alternatively, the cell 32 may be detached from the buoyant structure 30, lifted vertically through the opening 40 and each cell unit 52 detached and removed individually. The method further comprises modifying the length of each cell 32 by adding or removing cell units 52.

The method further comprises creating a substantially plug-flow effect of water flow through the cells 32. The substantially plug-flow effect may be created by providing a concentration gradient through the reactor, such as by providing a tortuous path through the plurality of cells for the water therethrough. The method may further comprise blocking water flow around the reactor 12 such that the water to be treated flows substantially through the reactor 12. The method is a continuous flow process.

In other embodiments, the method includes mixing the water before or after passing through the reactor 12 and/or allowing the water to settle before or after passing through the reactor 12. Other treatment chains (methods and systems) which can employ reactor 12 include those for nitrification, and/or denitrification, and/or carbon removal. In one example treatment chain incorporating embodiments of reactor 12, there is provided an aerated mixing zone, followed by the reactor 12, followed by a second aerated mixing zone, followed by the second reactor 14, followed by a settling zone. In another example, there is provided two aerated mixing zones, followed by reactor 12, followed by a settling zone. In another example treatment chain, there is provided an aerated mixing zone, followed by the reactor 12, followed by a second aerated mixing zone, followed by a settling zone.

In the embodiment illustrated in FIGS. 5-7, the method includes installing a second reactor 14, as described above, on the body of water, positioning the second reactor 14 in series with the first reactor 12, and providing a settling zone 24 between the first and the second reactors, wherein the water is passed through the mid-settling zone 24 between the first and second reactors 12, 14 before passing through the second reactor 14. In a preferred embodiment, the water to be treated is additionally passed through the inlet settling zone 26 which is upstream of the first reactor 12 and/or the outlet settling zone 28 which is downstream of the second reactor 14. The treated water is discharged as treated effluent from the second reactor 14 and/or the outlet settling zone 28.

Identification of equivalent systems and methods are well within the skill of the ordinary practitioner and would require no more than routine experimentation, in light of the teachings of the present disclosure.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented. Examples of changes, substitutions, and alterations are ascertainable by one skilled in the art and could be made without departing from the scope of the information disclosed herein. For example, it will be appreciated that the reactor can be used in any other suitable water treatment system or chain. The reactor need not be buoyant. The reactor may have a different number of cells and cell units than that illustrated in the specific examples. The cells may be attached to covers, when present, or directly to the frame of the buoyant structure. The biomedia need not be a thin film as described but may also take any other form or shape. All references cited herein are incorporated by reference in their entirety and made part of this application.

Practice of the disclosure will be still more fully understood from the following examples, which are presented herein for illustration only and should not be construed as limiting the disclosure in any way.

EXAMPLES

The following examples are illustrative of the wide range of applicability of the present invention and are not intended to limit its scope. Modifications and variations can be made therein without departing from the spirit and scope of the invention. Although any method and material similar or equivalent to those described herein can be used in the practice for testing of the present invention, the preferred methods and materials are described.

Example 1—Reactor Comprising Three Cells and Biomedia

A pilot study was conducted of a reactor in a body of water, the reactor comprising an array of three cells attached to a buoyant structure. The body of water comprised a 115 L insulated tank containing the cells. Cells had a cylinder shape with a height of 0.3 m and a diameter of 0.2 m. The body of water was fed with the effluent of a 1.5 day retention time settling tank through an inlet and treated water collected through an outlet. The settling tank was fed with raw municipal wastewater without any screening or grit removal. The cells contained thin elongate unattached biomedia strips which were self supporting and distributing in the body of water, as described above. The biomedia specific surface was 165 $m^2/m^3$. The media was retained within the cell by a plastic mesh. Fine and course bubble diffusers were provided at a distal end of the cells. The fine bubble diffusers were switched on continuously and the coarse bubble diffusers were activated for 4 minutes per hour. Different operating conditions were tested to assess the treatment capacity of the reactor under different water temperatures and different loading rates. In the first set of conditions, the reactor operated at a loading rate of about 2.4 g sCBOD5/$m^2$·d and at a temperature of 0.6° C. Testing of the effluent showed an average $CBOD_5$, $sCBOD_5$ and TSS concentration of 53.0 mg/l, 8.7 mg/L and 106.6 mg/l respectively. The nitrification rate was 3.6%.

In the second set of conditions, the reactor operated at a loading rate of about 0.4 g sCBOD5/$m^2$·d and at a temperature of 0.8° C. Testing of the effluent showed an average $CBOD_5$, $sCBOD_5$ and TSS concentration of 13.8 mg/l, 4.8 mg/L and 32.3 mg/l respectively. The nitrification rate was 62.5%.

In the third set of conditions, the reactor operated at a loading rate of about 2.3 g sCBOD5/$m^2$·d and at a tempera-ture of 14.6° C. Testing of the effluent showed an average $CBOD_5$, $sCBOD_5$ and TSS concentration of 23.4 mg/l, 4.4 mg/L and 53.6 mg/l respectively. The nitrification rate was 92.6%.

Example 2—Reactor Comprising Two Cells and Biomedia

This pilot study differed from that of Example 1 in that the reactor comprised two cells and the body of water comprised a limited access 3.4 $m^3$ tank installed in a 20 foot sea container. The body of water was fed with the effluent of a primary treatment through an inlet and treated water collected through an outlet. The primary treatment was fed with raw municipal wastewater without any screening or grit removal. The course bubble diffusers were activated for 3 minutes per hour.

Testing of the effluent of the primary treatment showed an average $CBOD_5$, $sCBOD_5$ and TSS concentration of 96.4 mg/l, 57.8 mg/L and 79.8 mg/l respectively. Preliminary testing of the effluent after less than 9 months of treatment time showed an average $CBOD_5$, $sCBOD_5$ and TSS concentration of 16.8 mg/l, 10.2 mg/L and 32.5 mg/l respectively. The nitrification rate was 38.2%. Since nitrification is influenced by water temperature, ammonia removal results can be separated in two distinct periods. During the winter season, from December 21 to March 20, the nitrification rate was 2.7%. For the period outside the winter season, the nitrification rate was 57.9%.

Example 3—Reactor Comprising One Cell and Biomedia

This pilot study differed from that of Example 1 in that the reactor comprised one cell in a limited access 1.7 $m^3$ tank installed in a 20 foot sea container. The cell had a cylinder shape with a height of 1.5 m and a diameter of 0.6 m. The body of water was fed with the effluent of a secondary treatment through an inlet and treated water collected through an outlet. The secondary treatment was fed from the effluent of a primary treatment fed with raw municipal wastewater without any screening or grit removal. Testing of the effluent of the secondary treatment showed an average $CBOD_5$, $sCBOD_5$ and TSS concentration of 10.6 mg/l, 8.1 mg/L and 14.55 mg/l respectively. Preliminary testing of the effluent after less than 9 months of treatment time showed an average $CBOD_5$, $sCBOD_5$ and TSS concentration of 6.0 mg/l, 5.5 mg/L and 10.63 mg/l respectively. The nitrification rate was 82.4%. Since nitrification is influenced by water temperature, ammonia removal results can be separated in two distinct periods. During the winter season, from December 21 to March 20, the nitrification rate was 73.0%. For the period outside the winter season, the nitrification rate was 87.6%.

Example 4—Reactor Comprising an Array of Cells and Biomedia in a Lagoon

A full scale study was conducted of the reactor in a water treatment chain in a body of water, the water treatment chain comprising an inlet settling zone followed by a first reactor followed by a mid-settling zone, followed by a second reactor, followed by an outlet settling zone. The body of water comprised about one third of an existing lagoon containing the reactors and settling zones. Aeration of the lagoon in treatment chain zones was stopped. The inlet settling zone had an hydraulic retention time of about 1.8 day and an overflow rate of about 1.9 m³/m²·d. The first reactor comprised 10 immersed cells arranged as an array and supported by a buoyant structure operating at a load of about 3.9 g sCBOD$_5$/m²·d. Each cell had a diameter of 0.6 m and a height of 3 m and comprised three cell units of 1 m height. The mid-settling zone had the same design as the inlet settling zone. The second reactor comprised 5 immersed cells arranged as an array and supported by a buoyant structure operating at a load of about 0.9 g sCBOD$_5$/m²·d. Cells had a diameter of 0.6 m and a height of 3 m and comprised three cell units of 1 m height. The outlet settling zone had the same design as the inlet settling zone and the mid-settling zone. The reactors comprised a buoyant structure made of hollow pipes defining a plurality of openings. Cells were attached to the floating structure and could be removed through the openings. Cells had a detachably attachable cover covering the openings and were substantially light impermeable. The different zones in the treatment chain were separated by polyester curtains detachably attached to the buoyant structure. Deflectors inbetween the cells of each reactor created a plug flow in the reactors. The body of water was fed with municipal wastewater through an inlet and treated water collected through an outlet. The cells of the first and second reactors comprised fine and coarse bubble diffusers. The cells contained the thin elongate unattached biomedia strips described above. The media specific surface was about 165 m²/m³. The media was retained within the cell by a plastic mesh. The fine bubble diffusers were switched on continuously and the coarse bubble diffusers were activated for 3 minutes per hour. Preliminary testing of the final effluent after less than 9 months of treatment time showed an average CBOD$_5$ and TSS concentration of 9.1 mg/l and 6.3 mg/l respectively. Nitrification did not take place during this period since the system was installed at the end of the month of September when water temperature was too cold to allow a sufficient autotrophic biomass growth.

It should be appreciated that the invention is not limited to the particular embodiments described and illustrated herein but includes all modifications and variations falling within the scope of the invention as defined in the appended claims.

The invention claimed is:

1. A reactor for treating water, the reactor comprising:
   a buoyant structure comprising a frame defining at least two openings therein,
   at least two detachably attachable covers for substantially covering the at least two openings and for providing a walkway,
   at least two cells removably attached to the buoyant structure, and each cell of the at least two cells being associated with a respective opening of the at least two openings,
   each cell of the at least two cells comprising a plurality of cell units being individually removable, at least one cell unit of the plurality of cell units housing biomedia,
   wherein each opening of the at least two openings is sized and shaped to allow the respective cell and the respective cell units to pass therethrough, and when in use:
   the buoyant structure extending generally across and being at least partially submerged in a body of water,
   the at least two cells extending downward into the body of water from the buoyant structure.

2. The reactor of claim 1, wherein the at least two cells comprises an array of cells.

3. The reactor of claim 1, wherein the cover is substantially light impermeable or light filtering.

4. The reactor of claim 1, wherein the at least one cell unit of the plurality of cell units comprises a water permeable wall arranged to retain biomedia within the cell.

5. The reactor of claim 1, wherein the biomedia housed within the at least one cell unit comprises an unattached elongate thin film with a nest-like configuration in use.

6. The reactor of claim 1, wherein the biomedia housed within the at least one cell unit has a surface area of about 160 to about 330 m² per cubic meter.

7. The reactor of claim 1, wherein the biomedia housed within the at least one cell unit occupies a volume in one unit of the plurality of cell units of about 1.0% to about 5.0%.

8. The reactor of claim 1, wherein the at least one cell contains at least one aeration device.

9. The reactor of claim 2, further comprising at least one deflector wall positioned between the cells to cause a substantially plug-flow effect of water flow through the cells.

10. The reactor of claim 1, wherein the plurality of cell units are removably attached together by at least one of:
    being removably attached to one another; and
    being removably connected together via at least one support structure.

11. The reactor of claim 1 further comprising at least one baffle being positioned across or around the at least one reactor for preventing water flow around the at least one reactor.

12. The reactor of claim 11, wherein the at least one baffle comprises at least one baffle opening to allow water to flow into the reactor when positioned across the reactor.

13. A reactor for treating water, the reactor comprising:
    a buoyant structure, and
    at least one cell removably attached to the buoyant structure,
    the at least one cell comprising a plurality of cell units being individually removable,
    when in use:
        the buoyant structure extending generally across and being at least partially submerged in a body of water and comprising a frame defining a plurality of openings therein, the openings being sized and shaped to allow at least one cell unit of the plurality of cell units to pass therethrough,
        the at least one cell extending downward into the body of water from the buoyant structure,
        at least one cell unit of the plurality of cell units housing biomedia, and
    at least one baffle being positioned across or around the at least one cell for preventing water flow around the at least one cell.

* * * * *